United States Patent
Kachare et al.

(10) Patent No.: US 12,271,322 B2
(45) Date of Patent: Apr. 8, 2025

(54) MULTI-FUNCTION FLEXIBLE COMPUTATIONAL STORAGE DEVICE

(71) Applicant: Samsung Electronics Co., Ltd., Suwon-si (KR)

(72) Inventors: Ramdas P. Kachare, Pleasanton, CA (US); Hingkwan Huen, Daly City, CA (US); Jimmy Lau, Santa Clara, CA (US); Howard R. Butler, San Jose, CA (US); Xuebin Yao, Mountain View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 26 days.

(21) Appl. No.: 17/669,351

(22) Filed: Feb. 10, 2022

(65) Prior Publication Data
US 2023/0051553 A1 Feb. 16, 2023
US 2024/0211418 A9 Jun. 27, 2024

Related U.S. Application Data

(60) Provisional application No. 63/232,631, filed on Aug. 12, 2021.

(51) Int. Cl.
*G06F 13/42* (2006.01)
*G06F 13/16* (2006.01)
(Continued)

(52) U.S. Cl.
CPC ...... *G06F 13/1673* (2013.01); *G06F 13/4221* (2013.01); *G06F 15/17331* (2013.01); *H04L 67/104* (2013.01); *H04L 67/1097* (2013.01)

(58) Field of Classification Search
CPC ............ G06F 13/1673; G06F 13/4221; G06F 15/17331; H04L 67/104; H04L 67/1097
(Continued)

(56) References Cited

U.S. PATENT DOCUMENTS 6,963,954 B1  11/2005  Trehus et al.
7,979,592 B1   7/2011  Pettey et al.
(Continued)

FOREIGN PATENT DOCUMENTS

CN   106484492 A   3/2017
CN   109379177 A   2/2019
(Continued)

OTHER PUBLICATIONS

Abdelsalam, Mohamed, "NVMe Solid State Drive Verification Solution using HW Emulation and Virtual Device Technologies," 2016 11th International Design & Test Symposium (IDT), 2016, pp. 47-52.
(Continued)

*Primary Examiner* — Christopher B Shin
(74) *Attorney, Agent, or Firm* — Renaissance IP Law Group LLP

(57) ABSTRACT

A multi-function device is disclosed. A first port may be used to communicate with a host processor. A second port may be used to communicate with a storage device. A third port may be used to communicate with a computational storage unit. Circuit may be used to route a message from the host processor to at least one of the storage device or the computational storage unit.

17 Claims, 15 Drawing Sheets

(51) Int. Cl.
  *G06F 15/17* (2006.01)
  *G06F 15/173* (2006.01)
  *H04L 67/104* (2022.01)
  *H04L 67/1097* (2022.01)
(58) Field of Classification Search
  USPC ........................................................ 711/154
  See application file for complete search history.

(56) References Cited

U.S. PATENT DOCUMENTS

| | | |
|---|---|---|
| 8,341,327 B2 | 12/2012 | Baba et al. |
| 8,412,863 B2 | 4/2013 | Tanaka et al. |
| 9,003,071 B2 | 4/2015 | Liu |
| 9,053,252 B2 | 6/2015 | Chang et al. |
| 9,292,551 B2 | 3/2016 | Kang et al. |
| 9,608,936 B1 | 3/2017 | Mehrotra et al. |
| 9,722,777 B2 | 8/2017 | Payton et al. |
| 10,007,443 B1 | 6/2018 | Rajadnya et al. |
| 10,007,634 B2 | 6/2018 | Dubal et al. |
| 10,073,981 B2 | 9/2018 | Arasu et al. |
| 10,318,476 B2 | 6/2019 | Slik |
| 10,394,746 B2 | 8/2019 | Kachare et al. |
| 10,509,758 B1 | 12/2019 | Habusha et al. |
| 10,635,609 B2 | 4/2020 | Olarig et al. |
| 10,678,732 B1 | 6/2020 | Long |
| 10,719,474 B2 | 7/2020 | Kachare et al. |
| 10,972,768 B2 | 4/2021 | Zou et al. |
| 11,074,013 B2* | 7/2021 | Suri .................... G06F 3/0607 |
| 11,132,326 B1 | 9/2021 | Modukuri et al. |
| 11,182,221 B1 | 11/2021 | Sivaramakrishnan et al. |
| 11,216,391 B1 | 1/2022 | Brandwine |
| 11,231,868 B2 | 1/2022 | Bates et al. |
| 11,269,669 B2 | 3/2022 | Chou et al. |
| 11,316,917 B2 | 4/2022 | Kachare et al. |
| 11,341,281 B2 | 5/2022 | Skourtis et al. |
| 11,366,894 B1 | 6/2022 | Parameshwaran et al. |
| 11,379,374 B2 | 7/2022 | Pinto |
| 11,416,176 B2 | 8/2022 | Agarwal |
| 2007/0285287 A1 | 12/2007 | Hussain et al. |
| 2008/0147898 A1 | 6/2008 | Freimuth et al. |
| 2009/0248973 A1 | 10/2009 | Deshpande et al. |
| 2011/0060859 A1 | 3/2011 | Shukla et al. |
| 2011/0131456 A1* | 6/2011 | Klinglesmith ...... H04L 12/6418 714/49 |
| 2011/0307639 A1* | 12/2011 | Dai ....................... H04L 49/70 710/106 |
| 2013/0007332 A1 | 1/2013 | Teh et al. |
| 2013/0080677 A1* | 3/2013 | Simmons ............ G06F 13/4068 710/316 |
| 2014/0310430 A1 | 10/2014 | Geddes et al. |
| 2015/0032910 A1 | 1/2015 | Ben et al. |
| 2015/0149661 A1 | 5/2015 | Kanigicherla et al. |
| 2015/0212797 A1 | 7/2015 | Bordawekar et al. |
| 2015/0317088 A1 | 11/2015 | Hussain et al. |
| 2016/0034415 A1 | 2/2016 | Singh et al. |
| 2016/0127494 A1 | 5/2016 | Liu et al. |
| 2016/0154756 A1 | 6/2016 | Dodson et al. |
| 2016/0306580 A1 | 10/2016 | Pinto |
| 2016/0378353 A1 | 12/2016 | Schmisseur et al. |
| 2017/0212579 A1 | 7/2017 | Tirumala et al. |
| 2017/0235510 A1 | 8/2017 | Hu et al. |
| 2018/0095915 A1 | 4/2018 | Prabhakar et al. |
| 2018/0101498 A1* | 4/2018 | Cosby .................. G06F 13/4282 |
| 2018/0246833 A1* | 8/2018 | Bai ...................... G06F 3/0617 |
| 2018/0260123 A1 | 9/2018 | Andresen et al. |
| 2018/0359318 A1 | 12/2018 | Rogers et al. |
| 2019/0114195 A1 | 4/2019 | Jani et al. |
| 2019/0235890 A1* | 8/2019 | Schnoor .............. G06F 13/4068 |
| 2019/0250845 A1 | 8/2019 | Kabra et al. |
| 2019/0266117 A1 | 8/2019 | Duncan |
| 2019/0272215 A1 | 9/2019 | Olarig et al. |
| 2020/0042246 A1* | 2/2020 | Maharana ............ G06F 3/0604 |
| 2020/0092603 A1 | 3/2020 | Fairhurst, Sr. et al. |
| 2020/0136799 A1 | 4/2020 | Smith et al. |
| 2020/0201661 A1 | 6/2020 | Chou et al. |
| 2020/0250119 A1 | 8/2020 | Cannata et al. |
| 2020/0257629 A1 | 8/2020 | Pinto |
| 2020/0401751 A1 | 12/2020 | Kachare et al. |
| 2021/0012282 A1 | 1/2021 | Smith et al. |
| 2021/0014047 A1 | 1/2021 | Bernat et al. |
| 2021/0019270 A1 | 1/2021 | Li et al. |
| 2021/0042254 A1 | 2/2021 | Marolia et al. |
| 2021/0117242 A1 | 4/2021 | Van De Groenendaal et al. |
| 2021/0117360 A1 | 4/2021 | Kutch et al. |
| 2021/0157487 A1 | 5/2021 | Guyer et al. |
| 2021/0181995 A1 | 6/2021 | Ki et al. |
| 2021/0182212 A1 | 6/2021 | Borikar et al. |
| 2021/0192076 A1 | 6/2021 | Patel et al. |
| 2021/0247935 A1 | 8/2021 | Beygi et al. |
| 2021/0250285 A1 | 8/2021 | Noureddine et al. |
| 2021/0255970 A1 | 8/2021 | Colenbrander |
| 2021/0263652 A1 | 8/2021 | Dube |
| 2021/0278998 A1 | 9/2021 | Li |
| 2021/0281618 A1 | 9/2021 | Mosur et al. |
| 2021/0311646 A1 | 10/2021 | Malladi et al. |
| 2021/0349841 A1 | 11/2021 | Makhervaks et al. |
| 2021/0373951 A1 | 12/2021 | Malladi et al. |
| 2022/0019441 A1 | 1/2022 | Rosing et al. |
| 2022/0029929 A1 | 1/2022 | Jain et al. |
| 2022/0066807 A1* | 3/2022 | Kashyap ............... G06F 3/0604 |
| 2022/0126210 A1 | 4/2022 | Kumar et al. |
| 2022/0129415 A1 | 4/2022 | Grunwald et al. |
| 2022/0150509 A1 | 5/2022 | Rosewarne |

FOREIGN PATENT DOCUMENTS

| | | |
|---|---|---|
| CN | 109656473 A | 4/2019 |
| CN | 111131882 A | 5/2020 |
| CN | 112667562 A | 4/2021 |
| CN | 112804297 A | 5/2021 |
| CN | 113312182 A | 8/2021 |
| CN | 114296638 A | 4/2022 |
| EP | 3940676 A1 | 1/2022 |
| EP | 3987387 A1 | 4/2022 |
| WO | 2021031619 A1 | 2/2021 |
| WO | 2021162591 A1 | 8/2021 |
| WO | 2022164490 A1 | 8/2022 |

OTHER PUBLICATIONS

Cousins, David Bruce et al., "Designing an FPGA-Accelerated Homomorphic Encryption Co-Processor," IEEE Transactions on Emerging Topics in Computing, vol. 5, No. 2, 2016, pp. 193-206.
European Extended Search Report for Application No. 22188425.7, dated Dec. 19, 2022.
Feldmann, Axel et al., "F1: A Fast and Programmable Accelerator for Fully Homomorphic Encryption," Proceedings of the 54th Annual IEEE/ACM International Symposium on Microarchitecture (MICRO-54), 2021, 15 pages.
Koo, Gunjae et al., "Summarizer: Trading Communication with Computing Near Storage," Proceedings of the 50th Annual IEEE/ACM International Symposium on Microarchitecture, 2017, pp. 219-231.
Samynathan, Balavinayagam et al, et al., "Computational Storage for Big Data Analytics," Proceedings of 10th International Workshop on Accelerating Analytics and Data Management Systems (ADMS '19), 2019, 9 pages.
European Extended Search Report for Application No. 22214413.1, dated May 4, 2023.
Chinese Office Action for Application No. 202010582886.0, mailed Jun. 30, 2023.
Corrected Notice of Allowability for U.S. Appl. No. 16/846,271, mailed Sep. 18, 2023.
European Extended Search Report for Application No. 23189399.1, mailed Jan. 26, 2024.
European Extended Search Report for Application No. 23189787.7, mailed Jan. 26, 2024.
Final Office Action for U.S. Appl. No. 16/846,271, mailed Sep. 20, 2022.

(56) References Cited

OTHER PUBLICATIONS

Notice of Allowance for U.S. Appl. No. 16/846,271, mailed Dec. 7, 2022.
Notice of Allowance for U.S. Appl. No. 16/846,271, mailed Mar. 27, 2023.
Office Action for U.S. Appl. No. 16/846,271, mailed May 25, 2022.
Office Action for U.S. Appl. No. 18/074,360, mailed Jan. 4, 2024.

\* cited by examiner

MULTI-FUNCTION FLEXIBLE COMPUTATIONAL STORAGE DEVICE

RELATED APPLICATION DATA

This application claims the benefit of U.S. Provisional Patent Application Ser. No. 63/232,631, filed Aug. 12, 2021, which is incorporated by reference herein for all purposes.

This application is a continuation-in-part of U.S. patent application Ser. No. 16/846,271, filed Apr. 10, 2020, now U.S. Pat. No. 11,809,799, issued Nov. 7, 2023, which claims the priority of U.S. Provisional Patent Application Ser. No. 62/865,962, filed Jun. 24, 2019, and U.S. Provisional Patent Application Ser. No. 62/964,114, filed Jan. 21, 2020, all of which are hereby incorporated by reference.

FIELD

The disclosure relates generally to storage devices, and more particularly to a bridge that permits access to a storage device and one or more computational storage units.

BACKGROUND

The present background section is intended to provide context only, and the disclosure of any concept in this section does not constitute an admission that said concept is prior art.

With the increase in capacity offered by storage devices, applications may process more and more data. Transferring large amounts of data from the storage device to main memory for an application to process may require significant amounts of time. In addition, having the host processor execute the commands to process that data may impose a burden on the host processor.

A need remains to improve the processing data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
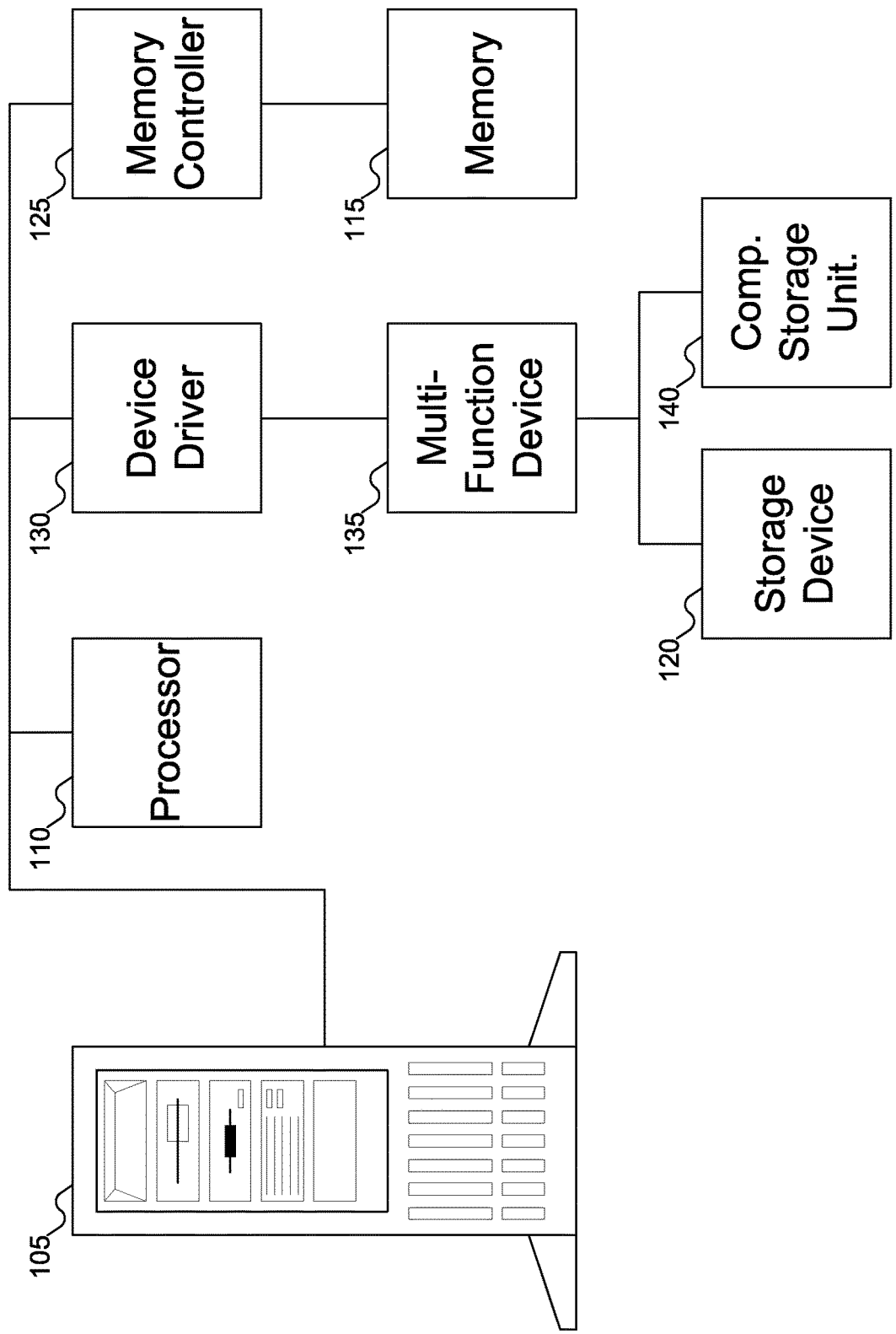
FIG. 1 shows a machine including a multi-function device to support modular storage devices and/or computational storage units, according to embodiments of the disclosure.

Embodiments of the disclosure include one or more bridges. The bridge may support one or more storage devices and one or more computational storage units. The bridge may expose functions to the host processor similar to those offered by the storage devices and computational storage units. The bridge may support transferring data between the storage devices and the computational storage units.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

As storage devices increase in capacity, the amount of data to be processed by an application may also increase. The time required to transfer such data between the storage device and main memory may increase, potentially slowing down execution of the application. In addition, having the host processor execute the commands may place a burden on the host processor, which may reduce the cycles available for the host processor to execute other commands.

Embodiments of the disclosure address these problems by offering a bridge. The bridge may connect the host processor, one or more storage devices, and one or more computational storage units. The bridge may determine the functions offered by the storage devices and computational storage units, and may expose to the host processor similar functions. The computational storage units may carry out commands on behalf of the application. The host processor may communicate with the bridge, and the bridge may communicate with the storage devices and/or computational storage units.

The bridge may also include a buffer to enable the storage devices and/or computational storage units to share data without transferring the data through main memory.

FIG. 1 shows a machine including an accelerator to reduce data dimensionality and perform calculations, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Machine 105 may also include multi-function device 135 (which may also be termed an accelerator or a device). As discussed below, multi-function device 135 may support connections to storage device 120 and computational storage unit 140, but present to processor 110 as though storage device 120 and computational storage unit 140 were a single device. Multi-function device 135 may enable modularity in storage device 120 and/or computational storage unit 140, in that storage device 120 and/or computational storage unit 140 may be added or replaced without necessarily having to replace other components connected to multi-function device 135.

Multi-function device 135 may be implemented using any desired hardware. For example, multi-function device 135, or components thereof, may be implemented using a Field Programmable Gate Array (FPGA), an Application-Specific Integrated Circuit (ASIC), a central processing unit (CPU), a System-on-a-Chip (SoC), a graphics processing unit (GPU), a general purpose GPU (GPGPU), a data processing unit (DPU), a neural processing unit (NPU), a Network Interface Card (NIC), or a tensor processing unit (TPU), to name a few possibilities. Multi-function device 135 may also use a combination of these elements to implement multi-function device 135.

While FIG. 1 shows device driver 130, which is described above as supporting access to storage device 120, machine 105 may also include device drivers (not shown) for computational storage unit 140 and/or multi-function device 135. That is, embodiments of the disclosure may support device driver 130 supporting any or all of storage device 120, computational storage unit 140, or multi-function device 135, and embodiments of the disclosure may include additional device drivers to support any or all combinations of these components.

In some embodiments of the disclosure, device driver 130 (and other device drivers, such as to support computational storage unit 140) may provide application programming interfaces (APIs) to access storage device 120 and/or computational storage unit 140. By supporting existing device drivers, existing applications may be executed by processor 110 without change to the applications (although embodiments of the disclosure may involve modifications to other elements in a software stack). For example, a TPU may have a TPU device driver, or a GPU may have a GPU device driver: applications that access functions of the TPU or the GPU may continue to use the existing TPU device driver or GPU device driver. In addition, by supporting existing device drivers, computational storage unit 140 may be any computational storage unit, even if manufactured by a different manufacturer from storage device 120 and/or multi-function device 135. Further, in some embodiments of the disclosure, device driver 130 (or other device drivers) may be proprietary.

Embodiments of the disclosure may include any desired mechanism to communicate with storage device 120 and/or computational device 140. For example, storage device 120 and/or computational device 140 may connect to a bus, such as a Peripheral Component Interconnect Express (PCIe) bus, or storage device 120 and/or computational device 140 may include Ethernet interfaces or some other network interface. Other potential interfaces to storage device 120 and/or computational device 140 may include Remote Direct Memory Access (RDMA), Transmission Control Protocol/Internet Protocol (TCP/IP), InfiniB and, Serial Attached Small Computer System Interface (SCSI) (SAS), Internet SCSI (iSCSI), and Serial AT Attachment (SATA), among other possibilities.

Machine 105 may include a range of addresses in memory 115 that are addressable by processor 110, storage device 120, and/or computational storage unit 140. In some embodiments of the disclosure, processor 110 may allocate subsets of this address range that may be associated with commands to be sent to storage device 120 and/or computational storage unit 140. In addition, processor 110 may allocate a subset of this address range that may be associated with commands for peer-to-peer communication between storage device 120 and computational storage unit 140. That is, by associating a command with a particular address in memory 115, it may be possible to determine whether the command is intended for storage device 120, computational storage unit 140, or for transferring data between storage device 120 and computational storage unit 140. Note that memory 115 might not include enough memory to include such a physical address, but memory 115 is not necessarily required to actually enough memory to include such an address. For example, memory 115 might include 2 gigabytes (GB) of memory, but might support addressing up to 4 GB of memory. A subset of addresses, such as those between 2 GB and 3 GB, might be used to identify commands for peer-to-peer communication, even though memory 115 might not be able to process a request for those particular addresses. Multi-function device 135 may identify such commands based on the address assigned to the command, and may intercept such commands for processing.

Figure 2:
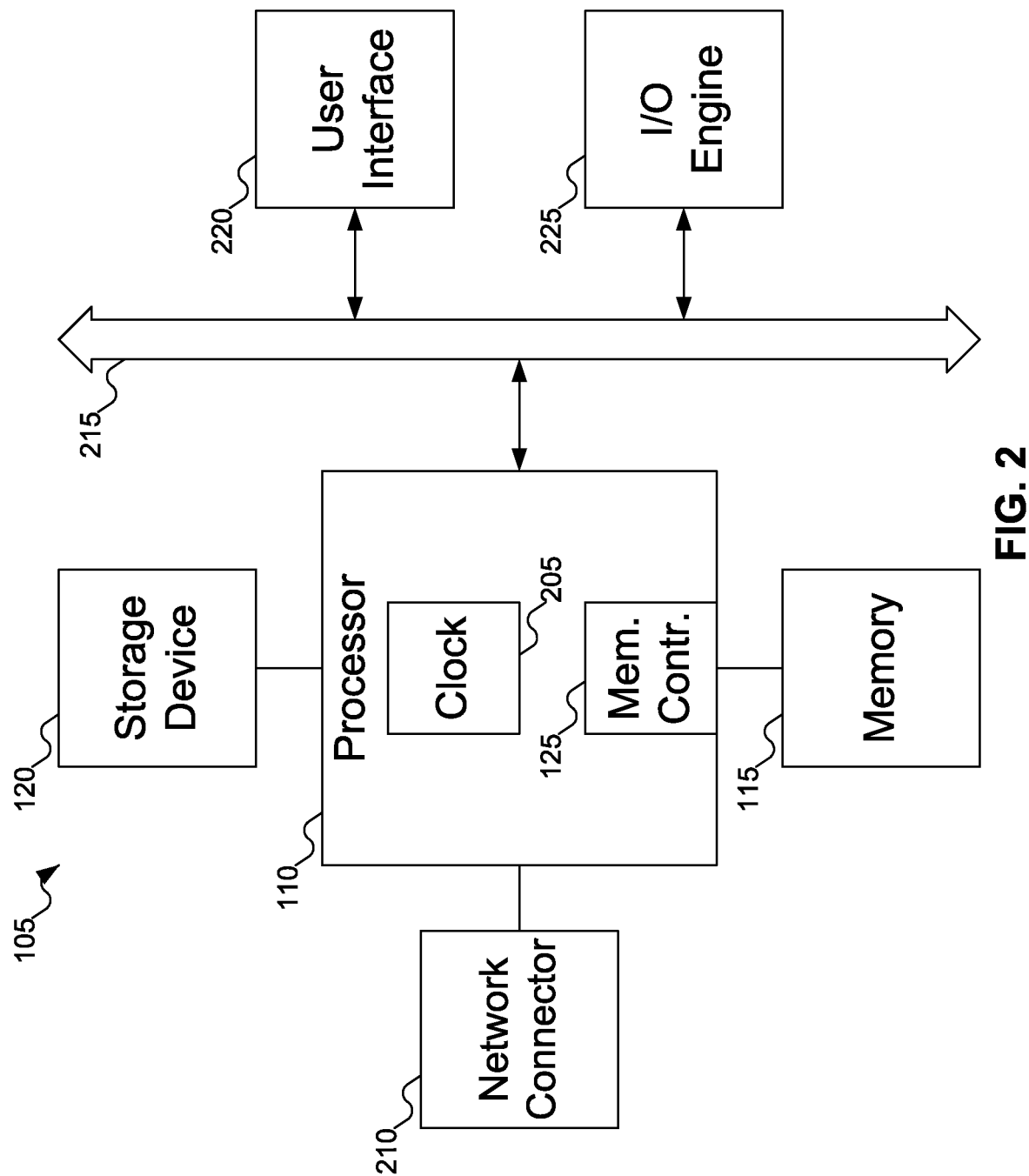
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
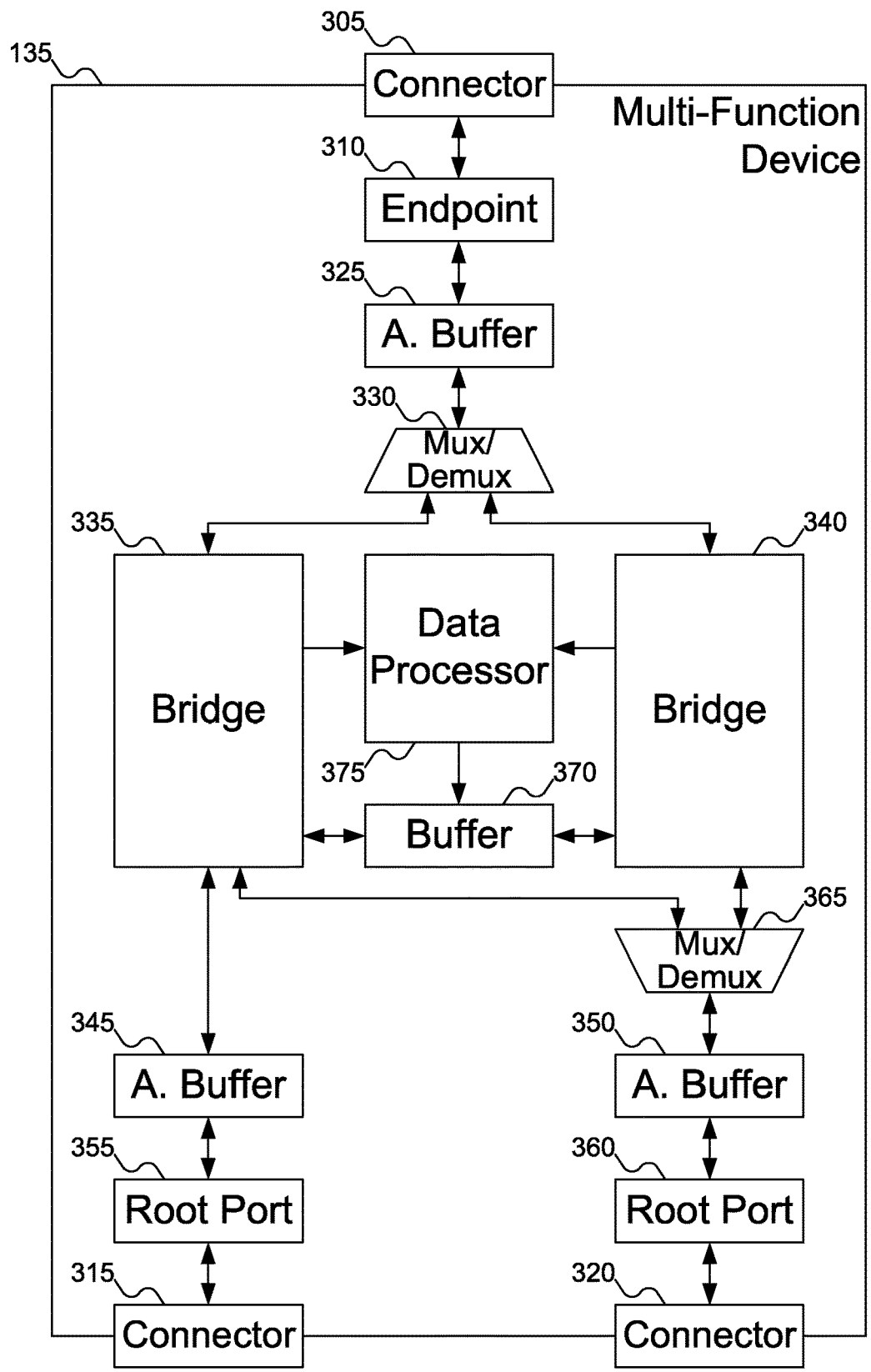
FIG. 3 shows details of the multi-function device of FIG. 1, according to embodiments of the disclosure.

FIG. 3 shows details of multi-function device 135 of FIG. 1, according to embodiments of the disclosure. In FIG. 3, multi-function device 135 may include connector 305. Connector 305 may provide a connection to a bus that may be used to communicate with processor 110 of FIG. 1. For example, connector 305 may provide a connection to a PCIe bus, but other busses may be used as well.

Endpoint 310 may be connected to (or implemented as part of) connector 305. Endpoint 310 may function as an endpoint for queries from processor 110 of FIG. 1. Endpoint 310 may expose functions of devices attached to other connectors of multi-function device 135, such as connectors 315 and 320, as discussed further below.

Asynchronous buffer 325 may be connected to endpoint 310 and/or connector 305. Asynchronous buffer 325 may act as a landing point for requests, messages, and/or data to be exchanged between host processor 110 of FIG. 1 and other devices connected to multi-function device 135. Asynchronous buffer 325 may be asynchronous, in that asynchronous buffer 325 may operate at a different clock cycle than processor 110. That is, processor 110 of FIG. 1 may send a request, message, or data based on the clock cycle of processor 110 of FIG. 1, which may be written into asynchronous buffer 325 when received from processor 110 of FIG. 1; the request, message, or data may then be read from asynchronous buffer 325 at a time governed by the clock cycle of multi-function device 135. By including asynchronous buffer 325, multi-function device 135 may avoid needing to operate at the same clock cycle as processor 110.

Note that in some embodiments of the disclosure, multi-function device 135 may operate using the same clock cycle as processor 110 of FIG. 1. In such embodiments of the disclosure, asynchronous buffer 325 may be omitted entirely, or replaced with a synchronous buffer (to permit temporary storage of requests, messages, and/or data received from or to be transmitted to processor 110 of FIG. 1).

Multiplexer/demultiplexer 330 may be connected to asynchronous buffer 325. Multiplexer/demultiplexer 330 may access requests, messages, and/or data from asynchronous buffer 325. Multiplexer/demultiplexer 330 may then determine which device connected to multi-function device 135 the request, message, or data is intended, and may route the request, message, or data accordingly. To accomplish this function, multiplexer/demultiplexer 330 may also be connected to bridges 335 and 340, each of which may ultimately deliver a request, message, or data to a particular device connected to multi-function device 135. In another embodiment of the disclosure, multiplexer/demultiplexer 330 may communicate with more than two bridges. How multiplexer/demultiplexer 330 may determines to which bridge a particular request should be delivered is discussed further below.

Bridges 335 and 340 may be connected to asynchronous buffers 345 and 350, respectively. Asynchronous buffers 345 and 350, like asynchronous buffer 325, may enable multi-function device 135 to operate at a different clock cycle than the various devices connected to connectors 315 and 320. In addition, like asynchronous buffer 325, in some embodiments of the disclosure multi-function device 135 may operate using the same clock cycle as the device(s) connected to connectors 315 and/or 320. In such embodiments of the disclosure, asynchronous buffer 345 and/or 350 may be omitted entirely, or replaced with synchronous buffers (to permit temporary storage of requests, messages, and/or data received from or to be transmitted to the devices connected to connectors 315 and/or 320).

Root ports 355 and 360 may be connected to asynchronous buffers 345 and 350 respectively (and may be implemented as part of connectors 315 and 320, respectively). Root ports 355 and 360 may communicate with devices connected to connectors 315 and 320, respectively. For example, storage device 120 of FIG. 1 may be connected to connector 315, and computational storage unit 140 of FIG. 1 may be connected to connector 320.

Root ports 355 and 360 may interrogate devices connected to connectors 315 and 320 for information about those devices. For example, devices connected to connectors 315 or 320 may expose various functions identifying requests that may be made of the devices.

In some embodiments of the disclosure, these functions may include one or more physical functions (PFs) and/or one or more virtual functions (VFs). Each PF may represent a resource, such as a function offered by the device. Each VF may represent a function that is associated with a PF, but is "virtualized": that is, for a given PF there may be one more VFs. PFs and VFs may be discovered by when the devices are enumerated: this enumeration may be performed by root ports 355 and 360 rather than by processor 110 of FIG. 1. While PFs, VFs, endpoints, and root ports are concepts commonly associated with PCIe devices, embodiments of the disclosure may include similar concepts when using devices that connect to other busses.

Once the PFs and VFs are enumerated, this information may be provided to bridges 335 and 340, and eventually be provided back to multiplexer/demultiplexer 330 and/or endpoint 310. In this manner, endpoint 310 may be capable of exposing the functions (PFs, VFs, or both) of the various devices connected to connectors 315 and 320. If there are any conflicts between the functions exposed by the devices connected to connectors 315 and 320 (for example, identical function identifiers), multiplexer/demultiplexer 330 and/or endpoint 310 may change the enumerations to avoid such conflicts. For example, devices may enumerate the functions starting at zero: if the devices connected to connectors 315 and 320 were both assigned the function number starting at zero, multiplexer/demultiplexer 330 might not be able to determine for which device a particular request associated with function number zero is intended. Thus, for example, if the device connected to connector 315 has three PFs and the device connected to connector 320 has two PFs, multiplexer/demultiplexer 330 may assign the PFs to the device connected to connector 315 using numbers 0, 1, and 2, and may assign the PFs to the device connected to connector 320 using numbers 3 and 4. As long as no two PFs are assigned the same number, multiplexer/demultiplexer 330 may map functions in any desired manner. In addition, VFs exposed by the devices connected to connectors 315 and/or 320 may be exposed as VFs or PFs (that is, VFs of the devices may map to PFs exposed by multi-function device 135).

With this understanding the operation of multiplexer/demultiplexer 330 may now be understood. Upon receiving a request, message, or data from processor 110 of FIG. 1 via connector 305, multiplexer/demultiplexer 330 may determine the identifier of the function for which the data is relevant. For example, if the request is a write request intended for storage device 120 of FIG. 1, multiplexer/demultiplexer 330 may identify the write function in the write request, and may internally map that write function to storage device 120 of FIG. 1. Multiplexer/demultiplexer 330 may then route the write request to bridge 335 or bridge 340, depending on which bridge may lead to storage device 120 of FIG. 1. More information about how exposed functions of the devices attached to connectors 315 and 320 may be exposed by multi-function device 135 may be found in U.S. patent application Ser. No. 16/846,271, filed Apr. 10, 2020, now pending, which claims the benefit of U.S. Provisional Patent Application Ser. No. 62/964,114, filed Jan. 21, 2020, and U.S. Provisional Patent Application Ser. No. 62/865,962, filed Jun. 24, 2019, all of which are incorporated by reference herein for all purposes.

While FIG. 3 shows multi-function device 135 as including three connectors 305, 315, and 320, which may connect to processor 110 of FIG. 1, storage device 120 of FIG. 1, and computational storage unit 140 of FIG. 1, embodiments of the disclosure may include any number of connectors. For example, multi-function device 135 may include four or more connectors: the additional connectors may connect to additional storage devices and/or computational storage units. Further, there may be any number (one or more) of storage devices and/or any number (one or more) of computational storage units connected to multi-function device 135 via connectors such as connectors 315 and 320. There is no requirement that the number of storage devices connected to multi-function device 135 be identical to the number of computational storage units connected to multi-function device 135. If multi-function device 135 includes more connectors than connectors 315 and 320, multi-function device 135 may also include additional bridges like bridges 335 and 340, additional asynchronous buffers like asynchronous buffers 345 and 350, and additional root ports like root ports 355 and 360, to support additional devices.

FIG. 3 also includes multiplexer/demultiplexer 365, which may be interposed between bridge 340 and asynchronous buffer 350. Multiplexer/demultiplexer 365 may be used in peer-to-peer communication between the devices connected to connectors 315 and 320. That is, using multiplexer/demultiplexer 365, it may be possible for the device attached to connector 320 to communicate with the device attached to connector 315 without having such communications to pass through processor 110 of FIG. 1 (via connector 305). To achieve this result, multiplexer/demultiplexer 365 may example information in a request, message, or data received at multiplexer/demultiplexer 365. Multiplexer/demultiplexer 365 may then identify any responses to such requests, messages, or data received from the device connected to connector 320, and may return such responses to the component that issued the original request, message, or data. For example, multiplexer/demultiplexer 365 may determine an identifier of the request, message, or data and the source from which the request, message, or data was received. Then, if multiplexer/demultiplexer 365 receives a response from the device connected to connector 320 associated with that identifier, multiplexer/demultiplexer 365 may send the response to the appropriate component.

As discussed above, in some embodiments of the disclosure, the devices connected to connectors 315 and 320 may be PCIe devices. In such embodiments of the disclosure, multiplexer/demultiplexer 365 may expect to process transaction layer packets (TLP).

In embodiments of the disclosure that support more than two devices connected to multi-function device 135, there may be a multiplexer/demultiplexer like multiplexer/demultiplexer 365 associated with devices attached to multi-function device 135. In some embodiments of the disclosure, such a multiplexer/demultiplexer may be interposed between a bridge like bridge 340 and an asynchronous buffer like asynchronous buffer 350 for all devices; in other embodiments of the disclosure, such a multiplexer/demultiplexer may be interposed between a bridge and an asynchronous buffer for computational storage units like computational storage unit 140 of FIG. 1 (but not for storage devices like storage device 120 of FIG. 1). Note that multiplexer/demultiplexer 365 and similar multiplexers/demultiplexers may be connected to some or all bridges like bridges 335 and 340, to support the exchange of data between various pairs of devices.

Note that multiplexer/demultiplexer 365 may receive requests, messages, and/or data from a device attached to connector 315, and from processor 110 of FIG. 1 attached to connector 305. In some embodiments of the disclosure, requests received by multiplexer/demultiplexer 365 from processor 110 of FIG. 1 and from the device attached to connector 315 may include tags that identify the request. For example, read requests may include a tag that identifies the request, so that data may be returned associated with the same tag. When such tagged requests are received from only one source, it may be expected that tags will not conflict: for example, multiplexer/demultiplexer 365 may reasonably assume that processor 110 of FIG. 1 would not assign the same tag to two different read requests. But when requests are received from multiple sources, unless the multiple sources coordinate their use of tags, it might happen that a request received from one source might have the same tag as a request received from another source. Upon receiving the data from computational storage unit 140 of FIG. 1, multiplexer/demultiplexer 365 might not be able to differentiate which device originated the read request: this situation could be a conflict.

There are several ways in which such a conflict might be avoided. One solution may be to process requests from only one source at a time, and the other source might wait until no requests from the first source are active. But this solution might not offer the best performance. Another solution may be to permit only requests with unique tags to be active at any time. Thus, so long as each request has a different tag from any other active requests, the request may be processed; if the request replicates a tag that is associated with another active request, the new request may be buffered until the active request with that tag is complete. This solution offers better performance. Yet another solution may be for multiplexer/demultiplexer 365 to provide tags that may be used by the various sources: so long as each source may be provided a set of tags that does not intersect with the set of tags assigned to another source, tag conflict may be avoided. Yet another solution may be for multiplexer/demultiplexer 365 to introduce a level of indirection, mapping tags from each source to new tags (used internally to multiplexer/demultiplexer 365). When a request is received, the tag may be mapped and the mapping from the original tag to the new tag may be stored in a table in multiplexer/demultiplexer 365. When the request is completed, multiplexer/demultiplexer 365 may determine the original tag from the new tag received with the response.

To support such operations, bridge 335 may also be capable of directing requests, messages, or data (whether received from processor 110 of FIG. 1 as received via connector 305 or from the device connected to connector 315) to multiplexer/demultiplexer 365. This situation may occur, for example, if the devices attached to connectors 315 and 320 may support direct memory addressing (DMA). For example, assume that storage device 120 of FIG. 1 is connected to connector 315 and computational storage unit 140 of FIG. 1 is connected to connector 320. If computational storage unit 140 of FIG. 1 includes a memory (such as a DRAM) and storage device 120 of FIG. 1 may issue a DMA request that may write data into that memory, bridge 335 may direct the DMA request to multiplexer/demultiplexer 365 (rather than to multiplexer/demultiplexer 330). In this manner processor 110 of FIG. 1 may be bypassed, which may result in the request being processed more expeditiously.

While having either storage device 120 of FIG. 1 or computational storage unit 140 of FIG. 1 read or write data directly from the other is useful, it is not always possible or practical. For example, to support DMA, one device may need a memory, and the other device may need a circuit to read data from or write data to that memory (in the first device). If either element is lacking (for example, if computational storage unit 140 of FIG. 1 includes neither memory nor a circuit to read or write a memory in storage device 120 of FIG. 1), then DMA might not be possible.

In addition, if DMA is used, then the devices may need to handle the data as stored, without processing. If the data may need processing before it is used, DMA might not be an option. For example, consider computational storage unit 140 of FIG. 1 operating to process video data. If computational storage unit 140 of FIG. 1 expects data to be in a particular format—for example, MPEG format—but the data is in another format—for example, WVM format—computational storage unit 140 of FIG. 1 might not be able to process the data unless the data is transcoded first. Or if data in a table is stored in column format but computational storage unit 140 of FIG. 1 expects the table to be stored in row format, the table might need to be transposed before computational storage unit 140 of FIG. 1 may process the data.

If storage device 120 of FIG. 1 includes a processor that may process the data so that it is in a format that may be used by computational storage unit 140 of FIG. 1, storage device 120 of FIG. 1 may process the data before DMA is used to transfer the data from storage device 120 of FIG. 1 to computational storage unit 140 of FIG. 1. But another approach may also be used.

Buffer 370 may be used to store data being transferred between the devices connected to connectors 315 and 320. Once the data is stored in buffer 370, data processor 375 may then process the data as appropriate before transfer to the destination device. Once the data in buffer 370 has been processed by data processor 375, the processed data may be transferred to the destination device. In some embodiments of the disclosure, DMA may be used by the devices to write data to or read data from buffer 370. Buffer 370 may use any desired form of storage: for example, DRAM, SRAM, or the like, and may be on-chip or off-chip.

Data processor 375 may perform any desired processing on data in buffer 370. Data processor 375 may include a circuit and/or software to perform some expected processing. But data processor 375 may also be general enough to support processing as instructed by processor 110 of FIG. 1. That is, processor 110 of FIG. 1 may download a program to data processor 375, which may then execute that program on data in buffer 370 to transform the data into a format expected by the destination device.

As discussed above, in some embodiments of the disclosure data processing may be performed to put the data in a format appropriate for the device designated to receive the data. But in some embodiments of the disclosure, data processing may be performed even if the device designated to receive the data may be able to process the data. For example, the data might already be in a format that may be acceptable to the destination device, but there might be a more optimal format. In such embodiments of the disclosure, data processor 375 may process the data even though the data is already in a format that may be acceptable to the destination device.

In some embodiments of the disclosure, processor 110 of FIG. 1 may act as the scheduler. In such embodiments of the disclosure, processor 110 of FIG. 1 may send a request to the source device. Upon receiving a response from the source device, processor 110 of FIG. 1 may then signal data processor 375 to being processing the data in buffer 370. Once data processor 375 has completed the processing of the data in buffer 370, data processor 375 may signal processor 110 of FIG. 1 that the processing is complete, after which processor 110 of FIG. 1 may request that the destination device read the data from buffer 370.

In other embodiments of the disclosure, data processor 375 may act as a scheduler for the data transfer. Data processor 375 may send a request to the source device, asking that the data be transferred to buffer 370. Note that bridges 335 and 340 may access buffer 370, to effect writing data to (and reading data from) buffer 370. Once the transfer is complete, the source device may signal data processor 375 that the transfer is complete. Data processor 375 may then transform the data as appropriate. Once data processor 375 has finished transforming the data in buffer 370, data processor 375 may signal the destination device that the data is ready for retrieval, and the destination device may then read the data from buffer 370. Data processor 375 may receive such instructions regarding scheduling from processor 110 of FIG. 1. These instructions may be encoded using any desired protocol: a new protocol may also be designed to support such scheduling instructions.

When computational storage unit 140 of FIG. 1 processes a request from processor 110 of FIG. 1 (or an application running on processor 110 of FIG. 1), that processing may use data from buffer 370 (potentially as processed by data processor 375). But that processing may also involve data from processor 110. For example, if computational storage unit 140 of FIG. 1 is performing image recognition, the data from storage device 120 of FIG. 1 may include information about how to recognize various features of an image. But the image itself to be processed may be provided by processor 110 of FIG. 1. Or, if computational storage unit 140 of FIG. 1 is processing a query on a database, the database itself may come from storage device 120 of FIG. 1, but the query may be provided by processor 110 of FIG. 1. Thus, information processed by computational storage unit 140 of FIG. 1 may come from different sources via multi-function device 135.

As discussed above, multi-function device 135 may include more than two connectors 315 and 320, and therefore may include more than two attached devices. In some embodiments of the disclosure, some or all attached devices may have access to buffer 370, and may read data from or write data to buffer 370. In other embodiments of the disclosure, there may be any number (one or more) of buffers 370 (and possibly more than one data processor 375 as well). For example, there may a buffer 370 associated with each computational storage unit 140 of FIG. 1 connected to multi-function device 135. In that manner, data may be written to a buffer associated with the computational storage unit 140 of FIG. 1 that is expected to process the data. Note that buffer 370 may also be used to exchange data between two (or more) storage devices 120 of FIG. 1 attached to multi-function device 135, or between two (or more) computational storage units 140 of FIG. 1: embodiments of the disclosure are not limited to using buffer 370 to exchange data between storage device 120 of FIG. 1 and computational storage unit 140 of FIG. 1. There may be one or more data processors 375 as well: the number of data processors 375 may be one-to-one with the number of buffers 370, or the number of data processors 375 may differ from the number of buffers 370.

In some embodiments of the disclosure, peer-to-peer communication may use a PCIe protocol for communication. That is, bridges 335 and/or 340 may use the PCIe protocol for transmission of requests, messages, and/or data to and/or from the devices connected to connectors 315 and 320. In other embodiments of the disclosure, peer-to-peer communication may use other protocols. In some embodiments of the disclosure, the devices connected to connectors 315 and 320 may use different protocols for communication (although in such embodiments of the disclosure some mapping of requests, messages, or data formats and/or protocols between or among the protocols may be needed).

As noted above, computational storage unit 140 of FIG. 1 may, among other possibilities, be an NIC. When an NIC is connected to connector 320, storage device 120 of FIG. 1 (when connected to connector 315) may be able to communicate with the NIC via peer-to-peer communication (using, for example, buffer 370). Multi-function device 135 may therefore support communication between storage device 120 of FIG. 1 and the NIC without such communication necessarily passing through processor 110 of FIG. 1. Note that using an NIC as computational storage unit 140 of FIG. 1, and connecting the NIC to connector 320, does not prevent processor 110 of FIG. 1 from communicating with the NIC: processor 110 of FIG. 1 may still communicate with the NIC via multi-function device 135. In addition, if multi-function device 135 includes additional connectors, another computational storage unit 140 of FIG. 1 may also be connected to multi-function device 135, also enabling that computational storage unit 140 of FIG. 1 to communicate with the NIC without such communication passing through processor 110 of FIG. 1. In this manner, an NIC may be treated as a computational storage unit and combined with one or more storage devices and/or one or more other computational storage units 140 of FIG. 1.

While FIG. 3 shows connectors 315 and 320 and suggests that connectors 315 and 320 may permit the replacement of the attached devices, embodiments of the disclosure may include one or more of connectors 315 and 320 as permanent connectors. In addition, some embodiments of the disclosure may include both permanent and swappable connectors. For example, storage device 120 of FIG. 1 might be permanently affixed to connector 315 (perhaps via soldering), whereas computational storage unit 140 of FIG. 1 might be plugged into connector 320, which may support detaching and replacing computational storage unit 140 of FIG. 1. In some embodiments of the disclosure, swapping a device connected to connectors 315 or 320 may be performed as a hot-swap (that is, without powering down machine 105 of FIG. 1 to perform the replacement); in other embodiments of the disclosure, swapping a device connected to connectors 315 or 320 may involve powering machine 105 of FIG. 1 down before replacing the device.

Figure 4:
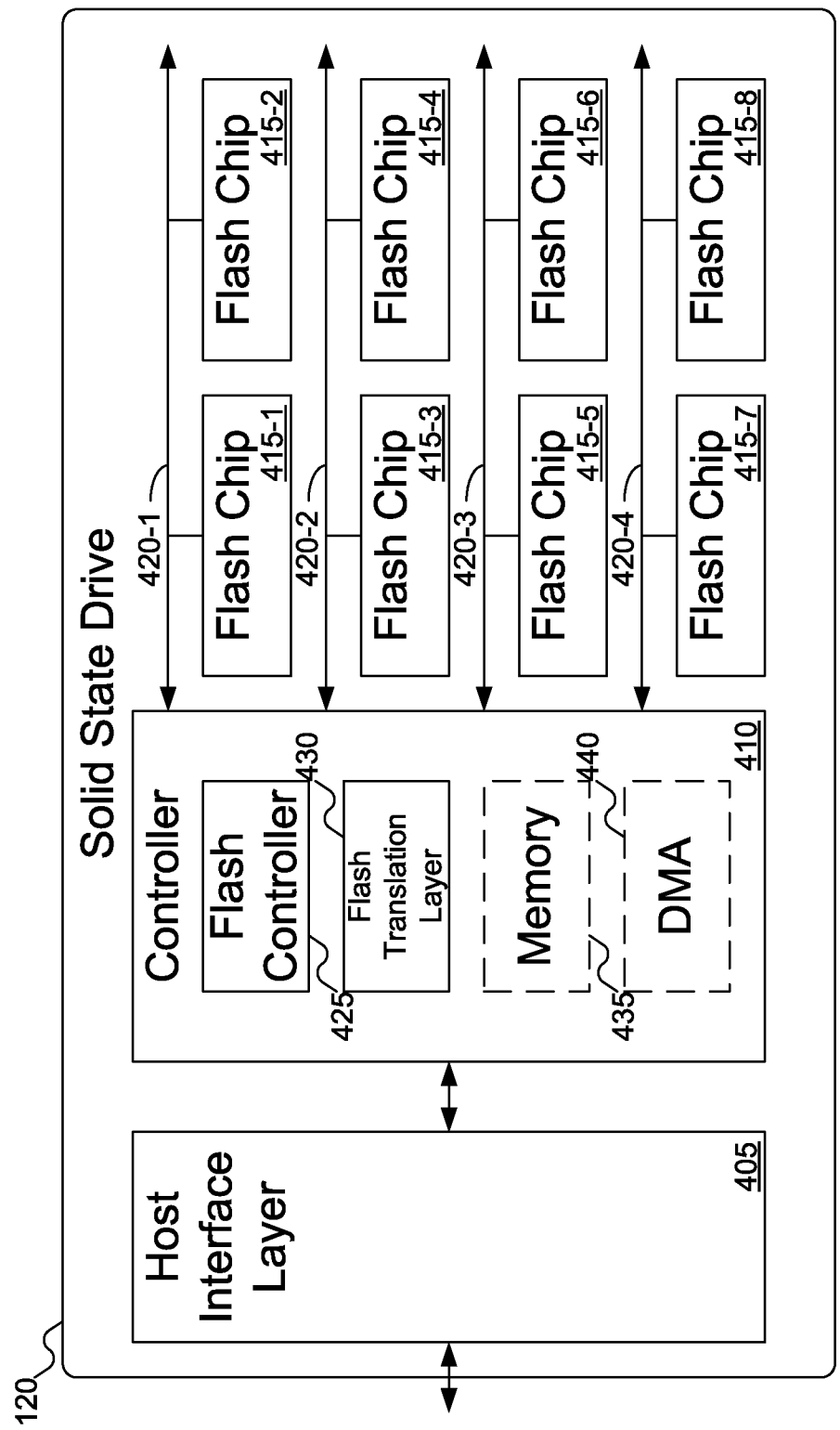
FIG. 4 shows details of the storage device of FIG. 1, according to embodiments of the disclosure.

FIG. 4 shows details of storage device 120 of FIG. 1, according to embodiments of the disclosure. In FIG. 4, the implementation of storage device 120 is shown as for a Solid State Drive. In FIG. 4, storage device 120 may include host interface layer (HIL) 405, controller 410, and various flash memory chips 415-1 through 415-8 (also termed "flash memory storage"), which may be organized into various channels 420-1 through 420-4. Host interface layer 405 may manage communications between storage device 120 and other components (such as processor 110 of FIG. 1) Host interface layer 405 may also manage communications with devices remote from storage device 120: that is, devices that are not considered part of multi-function device 135 of FIG. 1, but in communication with storage device 120: for example, over one or more network connections. These communications may include read requests to read data from storage device 120, write requests to write data to storage device 120, and delete requests to delete data from storage device 120.

Host interface layer 405 may manage an interface across only a single port, or it may manage interfaces across multiple ports. Alternatively, storage device 120 may include multiple ports, each of which may have a separate host interface layer 405 to manage interfaces across that port. Embodiments of the inventive concept may also mix the possibilities (for example, an SSD with three ports might have one host interface layer to manage one port and a second host interface layer to manage the other two ports).

Controller 410 may manage the read and write operations, along with garbage collection and other operations, on flash memory chips 415-1 through 415-8 using flash memory controller 425. SSD controller 410 may also include flash translation layer 430, memory 435, and/or DMA controller 440. Flash translation layer 430 may manage the mapping of logical block addresses (LBAs) (as used by host 105 of FIG. 1) to physical block addresses (PBAs) where the data is actually stored on storage device 120. By using flash translation layer 430, host 105 of FIG. 1 does not need to be informed when data is moved from one block to another within storage device 120.

Memory 435 may be a local memory, such as a DRAM, used by storage controller 410. Memory 435 may be a volatile or non-volatile memory. Memory 435 may also be accessible via DMA from devices other than storage device 120: for example, computational storage unit 140 of FIG. 1. Memory 435 may be omitted, as shown by its representation using dashed lines.

DMA 440 may be a circuit that enables storage device 120 to execute DMA commands in a memory outside storage device 120. For example, DMA 440 may enable storage device 120 to read data from or write data to memory 115 of FIG. 1 or a memory in computational storage unit 140 of FIG. 1. DMA 440 may be omitted, as shown by its representation using dashed lines.

While FIG. 4 shows storage device 120 as including eight flash memory chips 415-1 through 415-8 organized into four channels 420-1 through 420-4, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

Figure 5A:
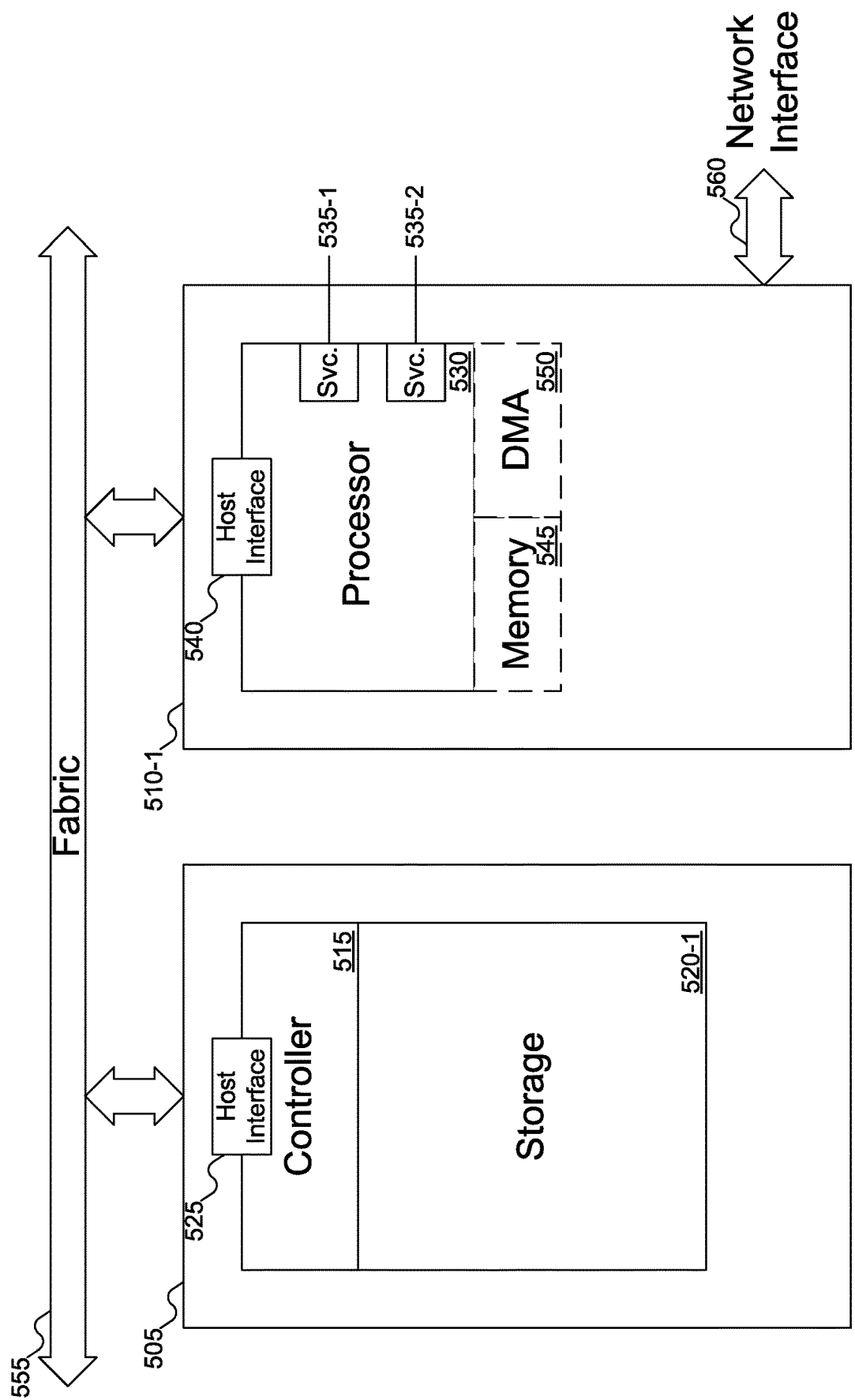
FIG. 5A shows a first example implementation of the computational storage unit of FIG. 1, according to embodiments of the disclosure.

FIGS. 5A-5D shows example implementations of computational storage unit 140 of FIG. 1, according to embodiments of the disclosure. In FIG. 5A, storage device 505 and computational device 510-1 are shown. Storage device 505 may include controller 515 and storage 520-1, and may be reachable across a host protocol interface, such as host interface 525. Host interface 525 may be used both for management of storage device 505 and to control I/O of storage device 505. An example of host interface 525 may include queue pairs for submission and completion, but other host interfaces 525 are also possible, using any native host protocol supported by storage device 505.

Computational device 510-1 may be paired with storage device 505. Computational device 510-1 may include any number (one or more) processors 530, which may offer one or more services 535-1 and 535-2. To be clearer, each processor 530 may offer any number (one or more) services 535-1 and 535-2 (although embodiments of the disclosure may include computational device 510-1 including exactly two services 535-1 and 535-2). Each processor 530 may be a single core processor or a multi-core processor. Computational device 510-1 may be reachable across a host protocol interface, such as host interface 540, which may be used for both management of computational device 510-1 and/or to control I/O of computational device 510-1. As with host interface 525, host interface 540 may include queue pairs for submission and completion, but other host interfaces 540 are also possible, using any native host protocol supported by computational device 510-1. Examples of such host protocols may include Ethernet, RDMA, TCP/IP, InfiniB and, iSCSI, PCIe, SAS, and SATA, among other possibilities. In addition, host interface 540 may support communications with other components of system 105 of FIG. 1—for example, a NIC, if the NIC is not connected to multi-function device 135 of FIG. 1—or to operate as a NIC and communicate with local and/or remote network/cloud components.

Processor(s) 530 may be thought of as near-storage processing: that is, processing that is closer to storage device 505 than processor 110 of FIG. 1. Because processor(s) 530 are closer to storage device 505, processor(s) 530 may be able to execute commands on data stored in storage device 505 more quickly than for processor 110 of FIG. 1 to execute such commands. Processor(s) 530 may have associated memory 545, which may be used for local execution of commands on data stored in storage device 505. Memory 545 may also be used similarly to memory 435 of FIG. 4, and may be accessible by DMA from devices other than computational storage unit 410-1. Memory 545 may include local memory similar to memory 115 of FIG. 1, on-chip memory (which may be faster than memory such as memory 115 of FIG. 1, but perhaps more expensive to produce), or both.

Computational storage unit 410-1 may also include DMA 550. DMA 550 may be used similarly to DMA 440 of FIG. 4, and may be used to access memories in devices other than computational storage unit 410-1.

Depending on the implementation, memory 545 and/or DMA 550 may be omitted, as shown by the dashed lines.

While FIG. 5A shows storage device 505 and computational device 510-1 as being separately reachable across fabric 555, embodiments of the disclosure may also include storage device 505 and computational device 510-1 being serially connected, or sharing multi-function device 135 of FIG. 1 (as shown in FIG. 1). That is, commands directed to storage device 505 and computational device 510-1 might both be received at the same physical connection to fabric 555 and may pass through one device (or multi-function device 135 of FIG. 1) to reach the other. For example, if computational device 510-1 is located between storage device 505 and fabric 555, computational device 510-1 may receive commands directed to both computational device 510-1 and storage device 505: computational device 510-1 may process commands directed to computational device 510-1, and may pass commands directed to storage device 505 to storage device 505. Similarly, if storage device 505 is located between computational device 510-1 and fabric 555, storage device 505 may receive commands directed to both storage device 505 and computational device 510-1: storage device 505 may process commands directed to storage device 505 and may pass commands directed to computational device 510-1 to computational device 510-1.

Services 535-1 and 535-2 may offer a number of different functions that may be executed on data stored in storage device 505. For example, services 535-1 and 535-2 may offer pre-defined functions, such as encryption, decryption, compression, and/or decompression of data, erasure coding, and/or applying regular expressions. Or, services 535-1 and 535-2 may offer more general functions, such as data searching and/or SQL functions. Services 535-1 and 535-2 may also support running application-specific code. That is, the application using services 535-1 and 535-2 may provide custom code to be executed using data on storage device 505. Services 535-1 and 535-2 may also any combination of such functions. Table 1 lists some examples of services that may be offered by processor(s) 530.

TABLE 1

Service Types

Compression
Encryption
Database filter
Erasure coding
RAID
Hash/CRC
RegEx (pattern matching)
Scatter Gather
Pipeline
Video compression
Data deduplication
Operating System Image Loader
Container Image Loader
Berkeley packet filter (BPF) loader
FPGA Bitstream loader
Large Data Set Processor(s) 530 (and, indeed, computational device 510-1) may be implemented in any desired manner. Example implementations may include a local processor, such as a CPU or some other processor (such as an FPGA, an ASIC, or a SoC), a GPU, a GPGPU, a DPU, an NPU, an NIC, or a TPU, among other possibilities. Processor(s) 530 may also be implemented using an FPGA or an ASIC, among other possibilities. If computational device 510-1 includes more than one processor 530, each processor may be implemented as described above. For example, computational device 510-1 might have one each of CPU, TPU, and FPGA, or computational device 510-1 might have two FPGAs, or computational device 510-1 might have two CPUs and one ASIC, etc.

Depending on the desired interpretation, either computational device 510-1 or processor(s) 530 may be thought of as a computational storage unit.

Some embodiments of the disclosure may include other mechanisms to communicate with storage device 505 and/or computational device 510-1. For example, storage device 505 and/or computational device 510-1 may include network interface 560, which may support communication with other devices using Ethernet, RDMA, TCP/IP, InfiniBand, SAS, iSCSI, or SATA, among other possibilities. Network interface 560 may provide another interface for communicating with storage device 505 and/or computational device 510-1. While FIG. 5A shows network interface 560 as providing communication to computational device 510-1, embodiments of the disclosure may include a network interface to storage device 505 as well. In addition, in some embodiments of the disclosure, such other interfaces may be used instead of host interfaces 525 and/or 540 (in which case host interfaces 525 and/or 540 may be omitted). Other variations, shown in FIGS. 5B-5D below, may also include such interfaces.

Figure 5B:
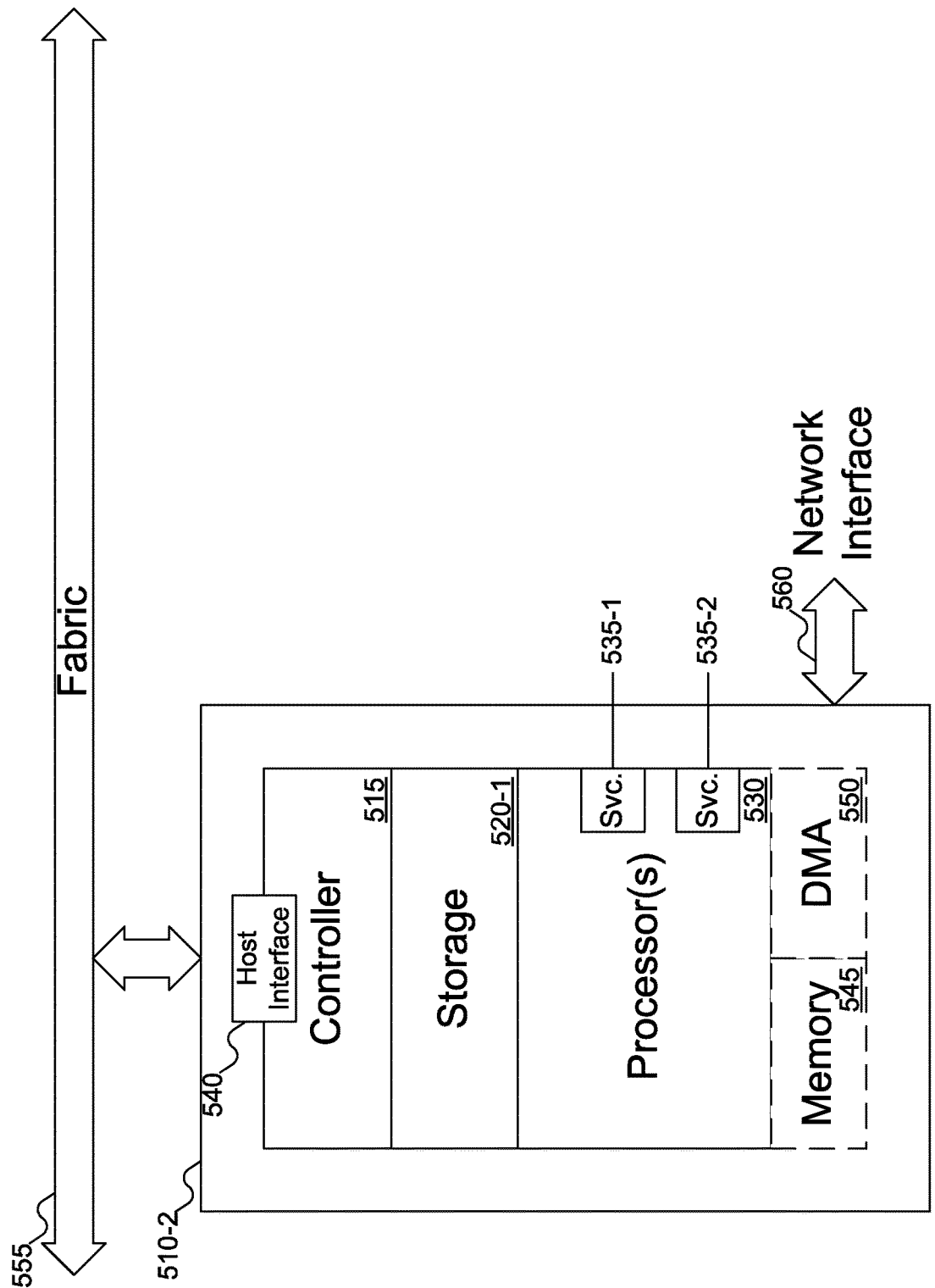
FIG. 5B shows a second example implementation of the computational storage unit of FIG. 1, according to embodiments of the disclosure.

Whereas FIG. 5A shows storage device 505 and computational device 510-1 as separate devices, in FIG. 5B they may be combined. Thus, computational device 510-2 may include controller 515, storage 520-1, processor(s) 530 offering services 535-1 and 535-2, memory 545, and/or DMA 550. As with storage device 505 and computational device 510-1 of FIG. 5A, management and I/O commands may be received via host interface 540 and/or network interface 560. Even though computational device 510-2 is shown as including both storage and processor(s) 530, FIG. 5B may still be thought of as including a storage device that is associated with a computational storage unit.

Figure 5C:
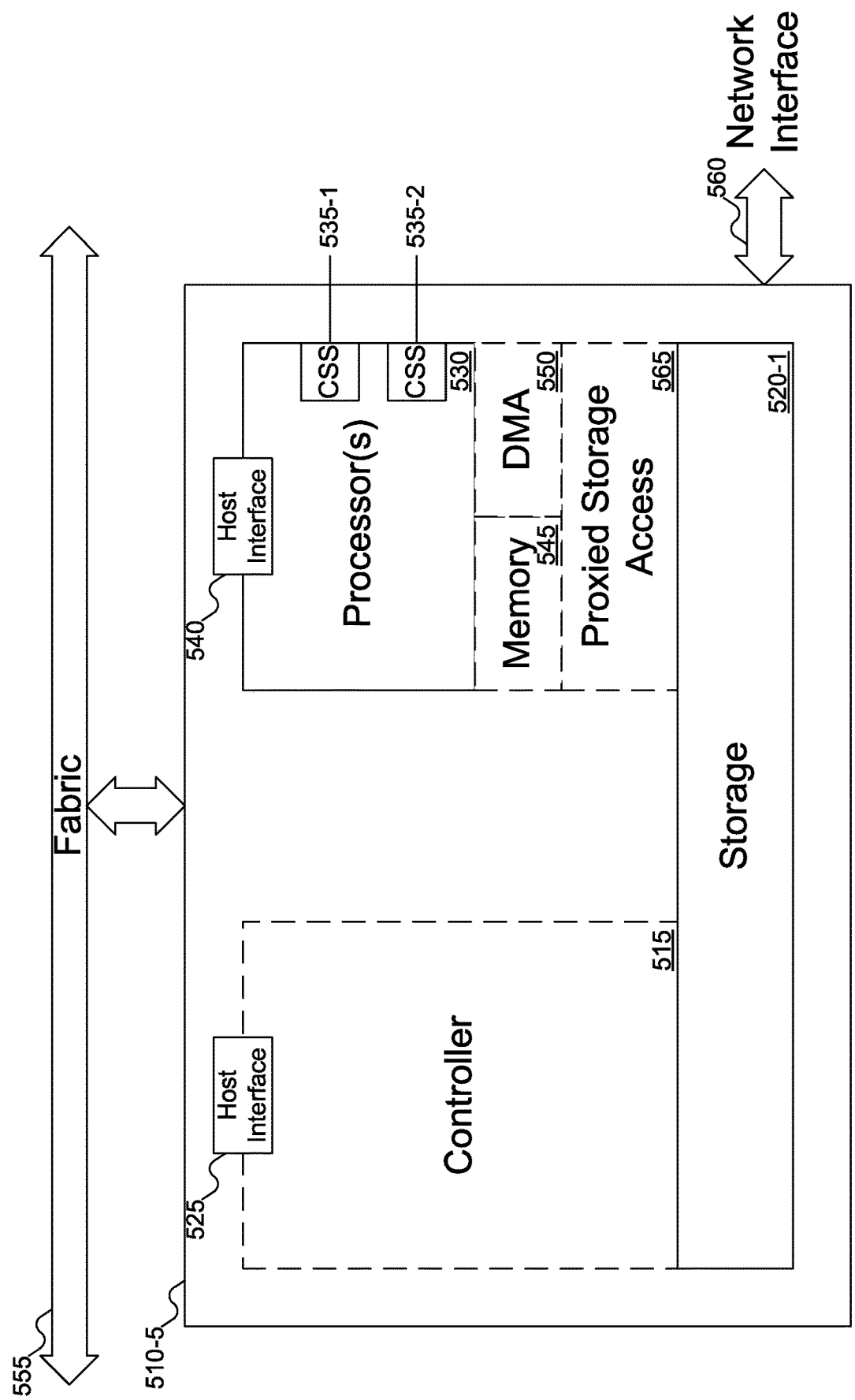
FIG. 5C shows a third example implementation of the computational storage unit of FIG. 1, according to embodiments of the disclosure.

In yet another variation shown in FIG. 5C, computational device 510-5 is shown. Computational device 510-3 may include controller 515 and storage 520-1, as well as processor(s) 530 offering services 535-1 and 535-2, memory 545, and/or DMA 550. But even though computational device 510-3 may be thought of as a single component including controller 515, storage 520-1, processor(s) 530 (and also being thought of as a storage device associated with a computational storage unit), memory 545, and/or DMA 550, unlike the implementation shown in FIG. 5B controller 515 and processor(s) 530 may each include their own host interfaces 525 and 540 and/or network interface 560 (again, which may be used for management and/or I/O). By including host interface 525, controller 515 may offer transparent access to storage 520-1 (rather than requiring all communication to proceed through processor(s) 530).

In addition, processor(s) 530 may have proxied storage access 565 to storage 520-1. Thus, instead of routing access requests through controller 515, processor(s) 530 may be able to directly access the data from storage 520-1.

In FIG. 5C, both controller 515 and proxied storage access 565 are shown with dashed lines to represent that they are optional elements, and may be omitted depending on the implementation.

Figure 5D:
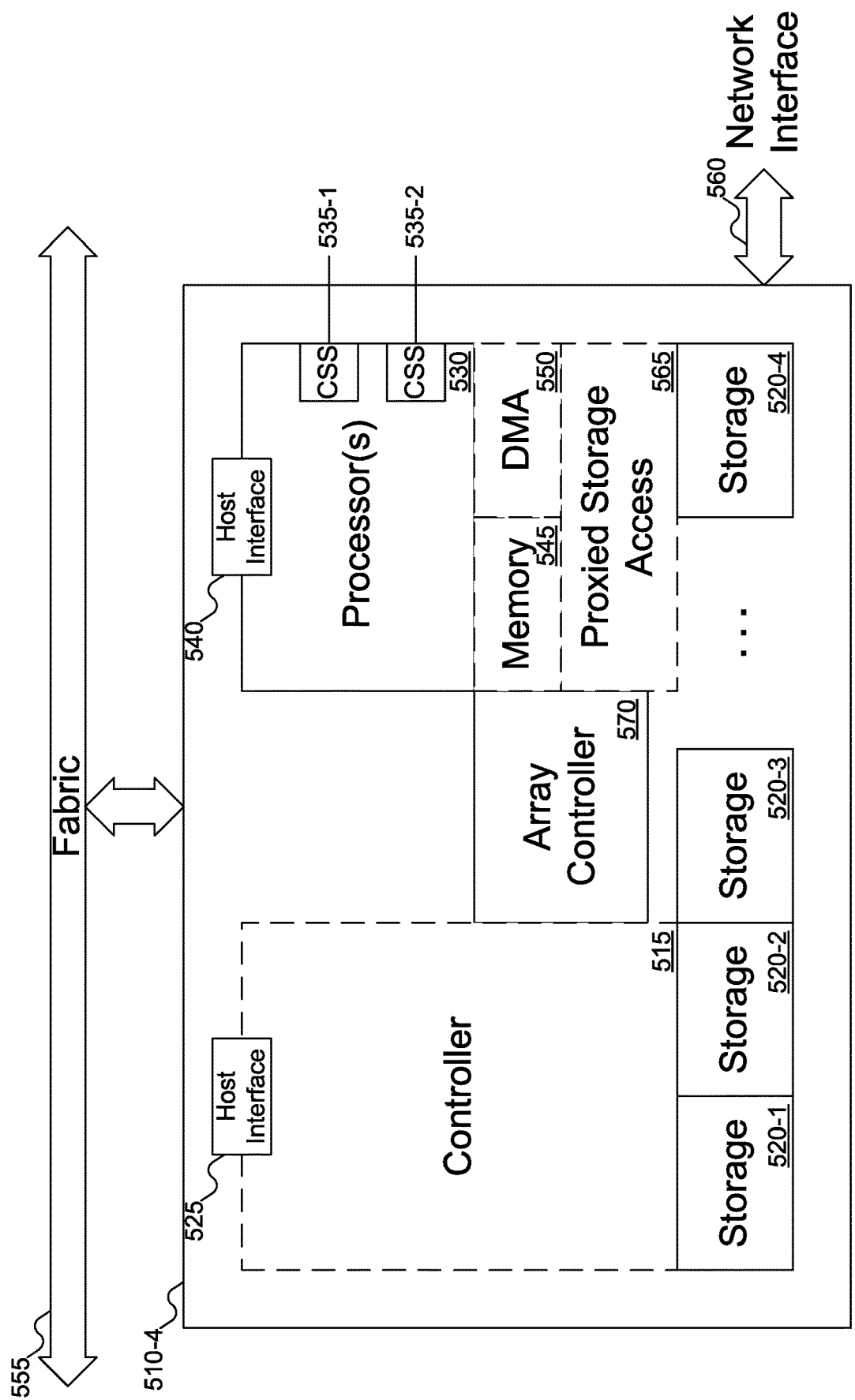
FIG. 5D shows a fourth example implementation of the computational storage unit of FIG. 1, according to embodiments of the disclosure.

Finally, FIG. 5D shows yet another implementation. In FIG. 5D, computational device 510-4 is shown, which may include controller 515, memory 545, DMA 550, and proxied storage access 565 similar to FIG. 5C. In addition, computational device 510-4 may include an array of one or more storage 520-1 through 520-4. While FIG. 5D shows four storage elements, embodiments of the disclosure may include any number (one or more) of storage elements. In addition, the individual storage elements may be other storage devices, such as those shown in FIGS. 5A-5D.

Because computational device 510-4 may include more than one storage element 520-1 through 520-4, computational device 510-4 may include array controller 570. Array controller 570 may manage how data is stored on and retrieved from storage elements 520-1 through 520-4. For example, if storage elements 520-1 through 520-4 are implemented as some level of a Redundant Array of Independent Disks (RAID), array controller 570 may be a RAID controller. If storage elements 520-1 through 520-4 are implemented using some form of Erasure Coding, then array controller 570 may be an Erasure Coding controller.

Figure 6:
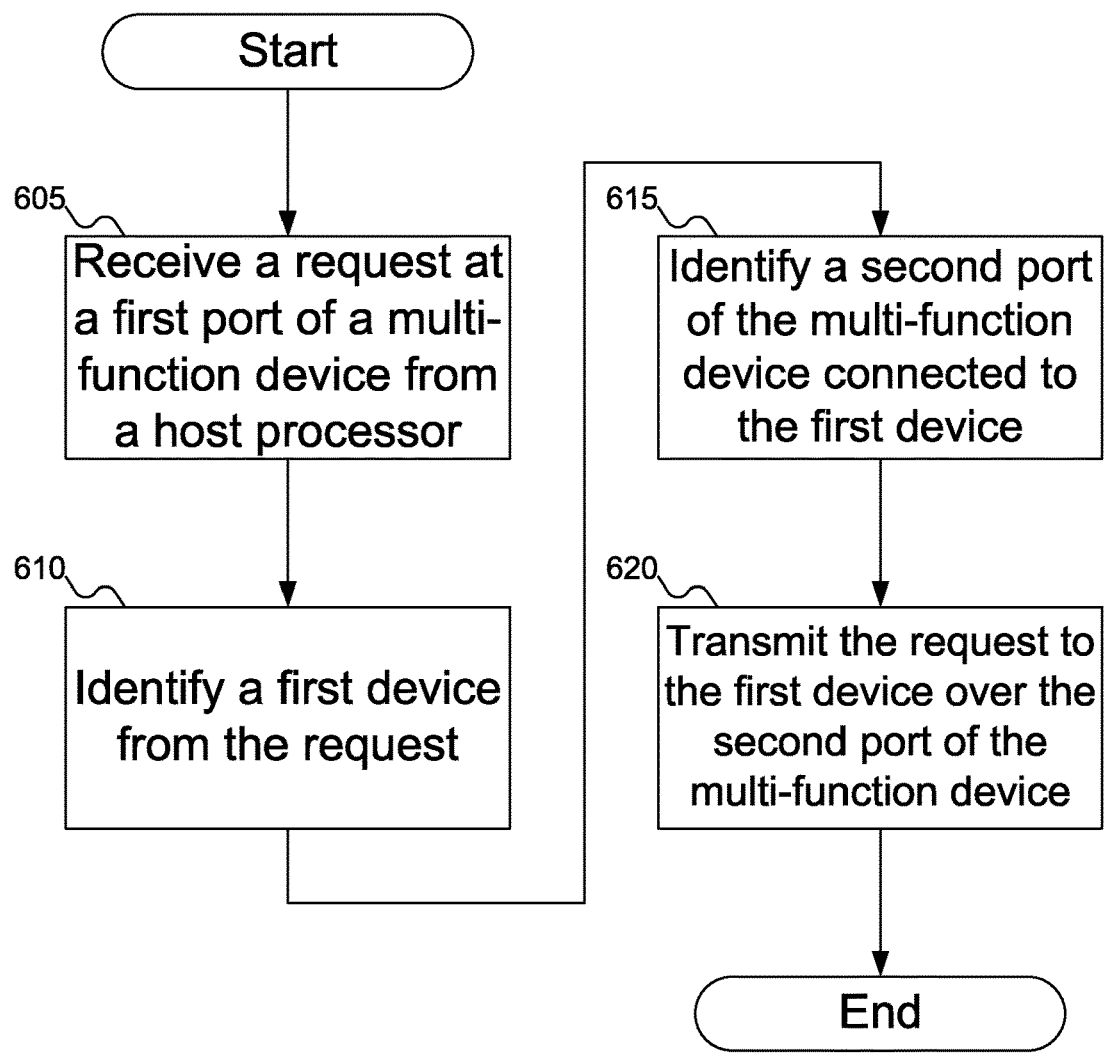
FIG. 6 shows a flowchart of an example procedure for using the multi-function device of FIG. 1 to deliver requests to the storage device of FIG. 1 and/or the computational storage unit of FIG. 1, according to embodiments of the disclosure.

FIG. 6 shows a flowchart of an example procedure for using multi-function device 135 of FIG. 1 to deliver requests to storage device 120 of FIG. 1 and/or computational storage unit 140 of FIG. 1, according to embodiments of the disclosure. In FIG. 6, at block 605, multi-function device 135 of FIG. 1 may receive a request at port 310 of FIG. 3. At block 610, multiplexer/demultiplexer 330 of FIG. 3 may identify a device from the request. At block 615, multiplexer/demultiplexer 330 of FIG. 3 may identify port 355 of FIG. 3 or port 360 of FIG. 3 as being connected to the device identified from the request. At block 620, multiplexer/demultiplexer 330 of FIG. 3, bridge 335 of FIG. 3 or bridge 340 of FIG. 3, and port 355 of FIG. 3 or port 360 of FIG. 3 may transmit the request to the device identified from the request.

Figure 7:
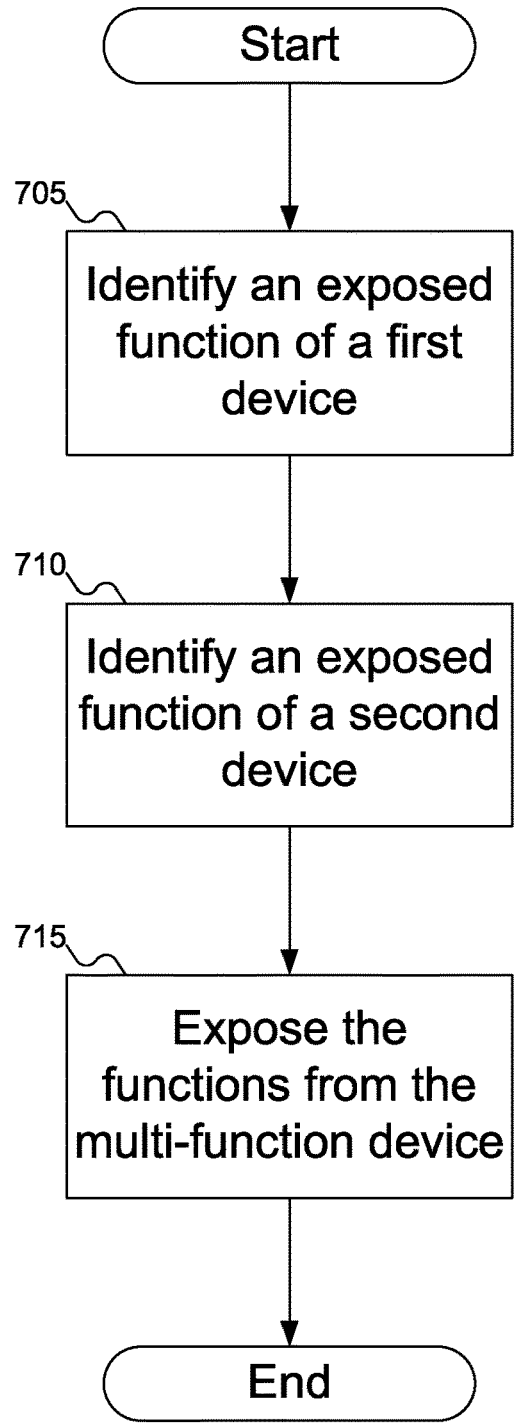
FIG. 7 shows a flowchart of an example procedure for using the multi-function device of FIG. 1 to identify exposed functions of the storage device of FIG. 1 and/or the computational storage unit of FIG. 1, according to embodiments of the disclosure.

FIG. 7 shows a flowchart of an example procedure for using multi-function device 135 of FIG. 1 to identify exposed functions of the storage device 120 of FIG. 1 and/or computational storage unit 140 of FIG. 1, according to embodiments of the disclosure. In FIG. 7, at block 705, root port 355 of FIG. 3 may identify a function exposed by the device connected to connector 315 of FIG. 3. At block 710, root port 360 of FIG. 3 may identify a function exposed by the device connected to connector 320 of FIG. 3. At block 715, endpoint 310 of FIG. 3 may expose the functions as from multi-function device 135 of FIG. 1.

Figure 8:
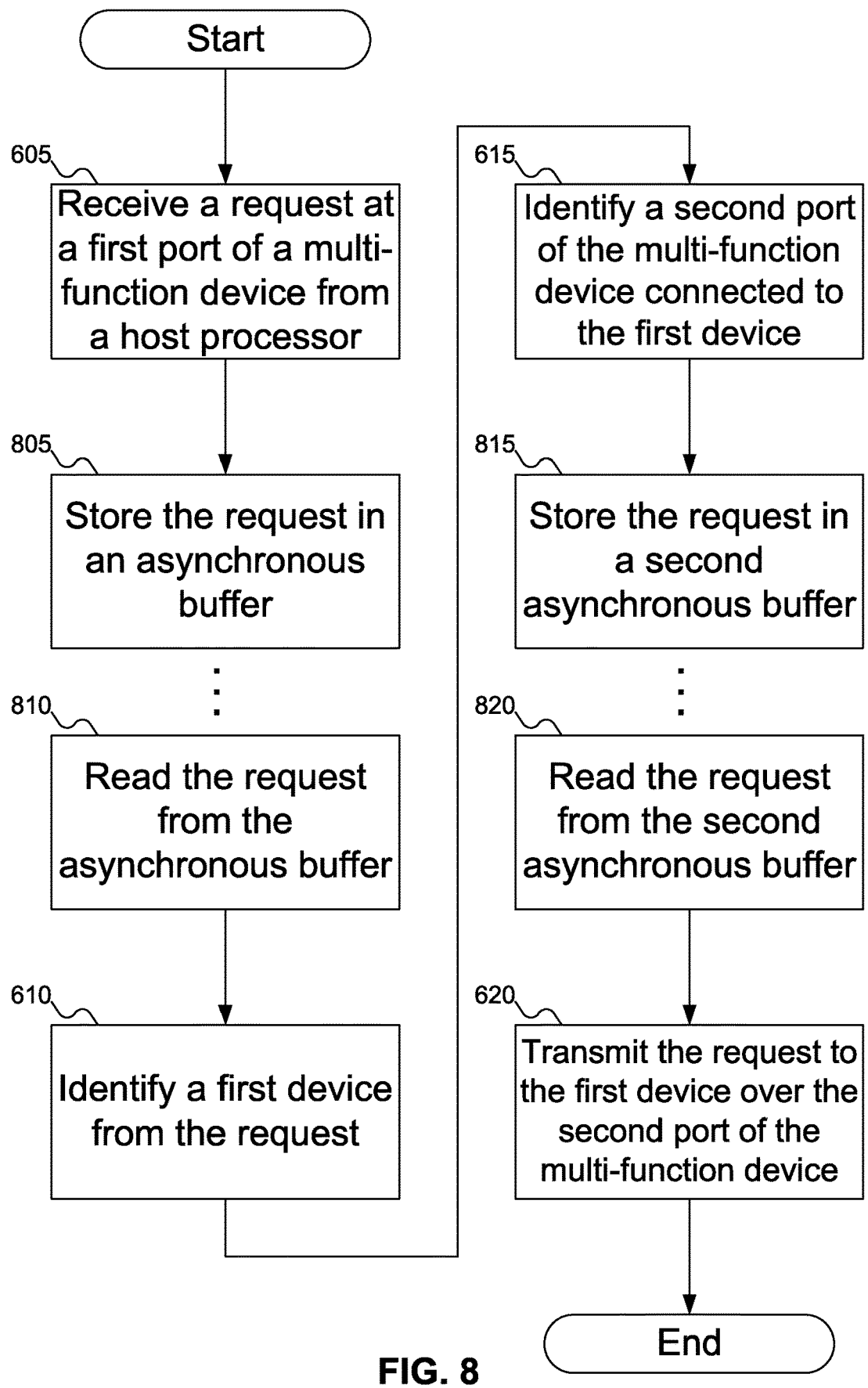
FIG. 8 shows a flowchart of an example procedure for using the asynchronous buffers of FIG. 3, according to embodiments of the disclosure.

FIG. 8 shows a flowchart of an example procedure for using the asynchronous buffers of FIG. 3, according to embodiments of the disclosure. In FIG. 8, at block 605, multi-function device 135 of FIG. 1 may receive a request at port 310 of FIG. 3. Block 605 uses the same identifier as block 605 of FIG. 6 as the operations described are the same. At block 805, multi-function device 135 of FIG. 1 may store the request in asynchronous buffer 325 of FIG. 3.

At block 810, at some later time, multiplexer/demultiplexer 330 of FIG. 3 may read the request from asynchronous buffer 325 of FIG. 3. At block 610, multiplexer/demultiplexer 330 of FIG. 3 may identify a device from the request. At block 615, multiplexer/demultiplexer 330 of FIG. 3 may identify port 355 of FIG. 3 or port 360 of FIG. 3 as being connected to the device identified from the request. Blocks 610 and 615 use the same identifiers as blocks 610 and 615 of FIG. 6 as the operations described are the same. At block 815, bridge 335 of FIG. 3 or bridge 340 of FIG. 3 may store the request in asynchronous buffer 345 of FIG. 3 or asynchronous buffer 350 of FIG. 3.

At block 820, at some later time, root port 355 of FIG. 3 may read the request from asynchronous buffer 345 of FIG. 3, or root port 360 of FIG. 3 may read the request from asynchronous buffer 350 of FIG. 3. At block 620, root port 355 of FIG. 3 or root port 360 of FIG. 3 may transmit the request to the device identified from the request. Block 620 uses the same identifier as block 620 of FIG. 6 as the operations described are the same.

Figure 9:
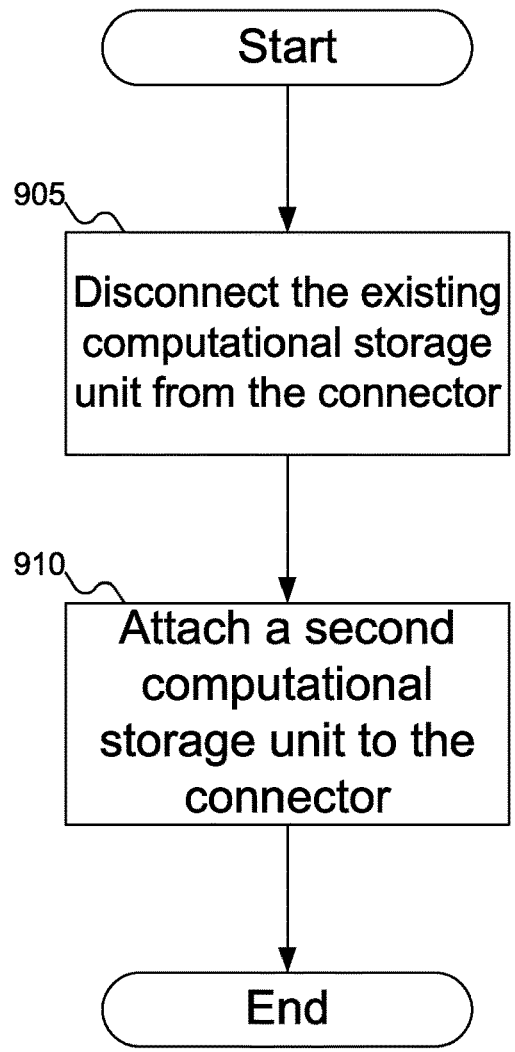
FIG. 9 shows a flowchart of an example procedure for replacing the computational storage unit of FIG. 1 with another computational storage unit, according to embodiments of the disclosure.

FIG. 9 shows a flowchart of an example procedure for replacing computational storage unit 140 of FIG. 1 with another computational storage unit, according to embodiments of the disclosure. At block 905, computational storage unit 140 of FIG. 1 may be disconnected from connector 320 of FIG. 3. At block 910, a new computational storage unit may be connected to connector 320 of FIG. 3.

Figure 10:
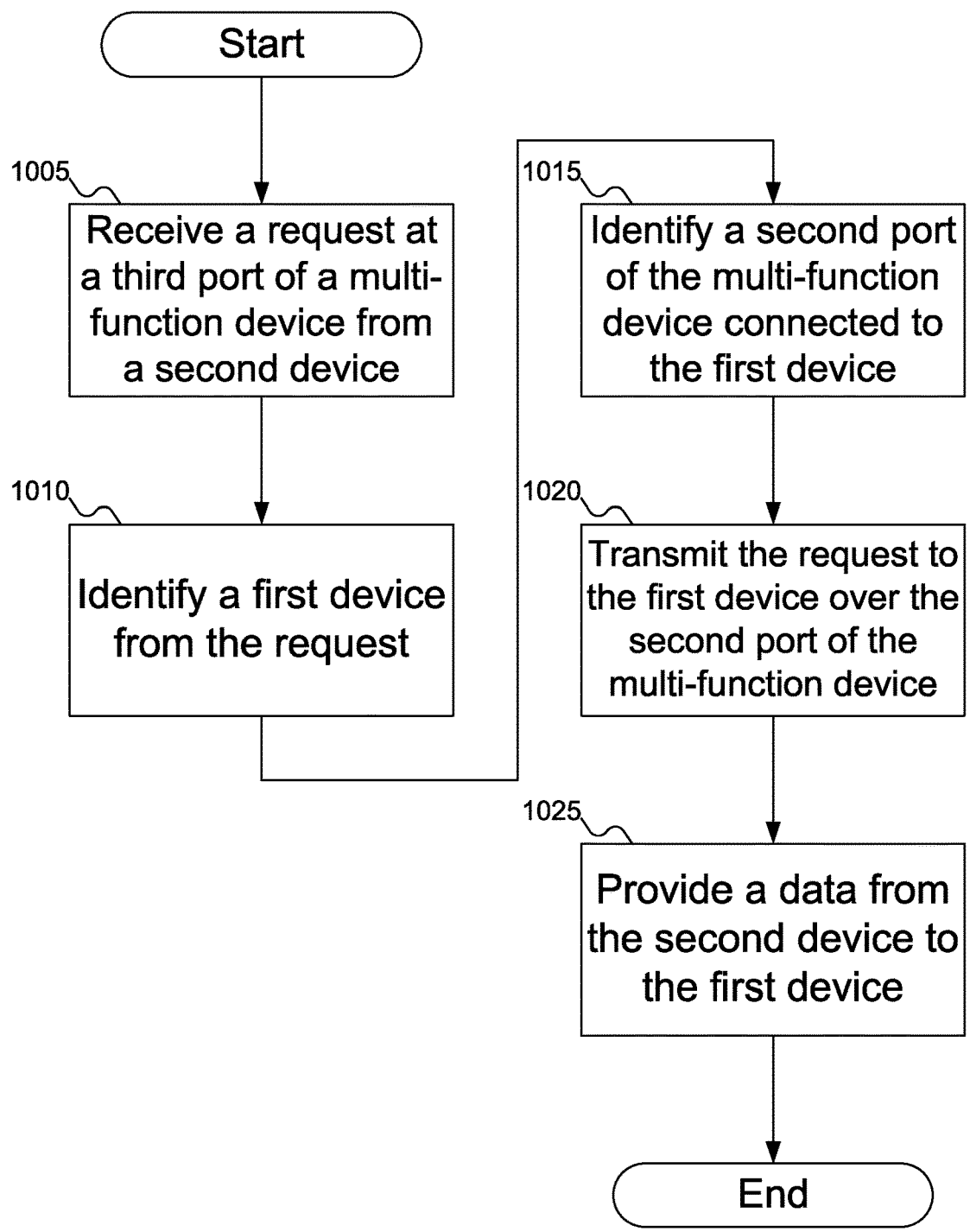
FIG. 10 shows a flowchart of an example procedure for using the multi-function device of FIG. 1 to deliver requests between devices attached to the multi-function device of FIG. 1, according to embodiments of the disclosure.

FIG. 10 shows a flowchart of an example procedure for using multi-function device 135 of FIG. 1 to deliver requests between devices attached to multi-function device 135 of FIG. 1, according to embodiments of the disclosure. At block 1005, multi-function device 135 of FIG. 1 may receive a request from a device connected to a port of multi-function device 135 of FIG. 1. Note that the device in question may be connected using port 355 of FIG. 3 or port 360 of FIG. 3, or other ports connected to other storage devices or computational storage units, rather than processor 110 of FIG. 1 connected to port 310 of FIG. 3. At block 1010, At block 1010, bridge 335 of FIG. 3 or bridge 340 of FIG. 3 may identify a device from the request. At block 1015, bridge 335 of FIG. 3 or bridge 340 of FIG. 3 may identify port 355 of FIG. 3 or port 360 of FIG. 3 as being connected to the device identified from the request. At block 1020, bridge 335 of FIG. 3 or bridge 340 of FIG. 3 may transmit the request to the device identified from the request. Finally, at block 1025, the device that sent the original request may provide data to the device identified in the request.

Figure 11A:
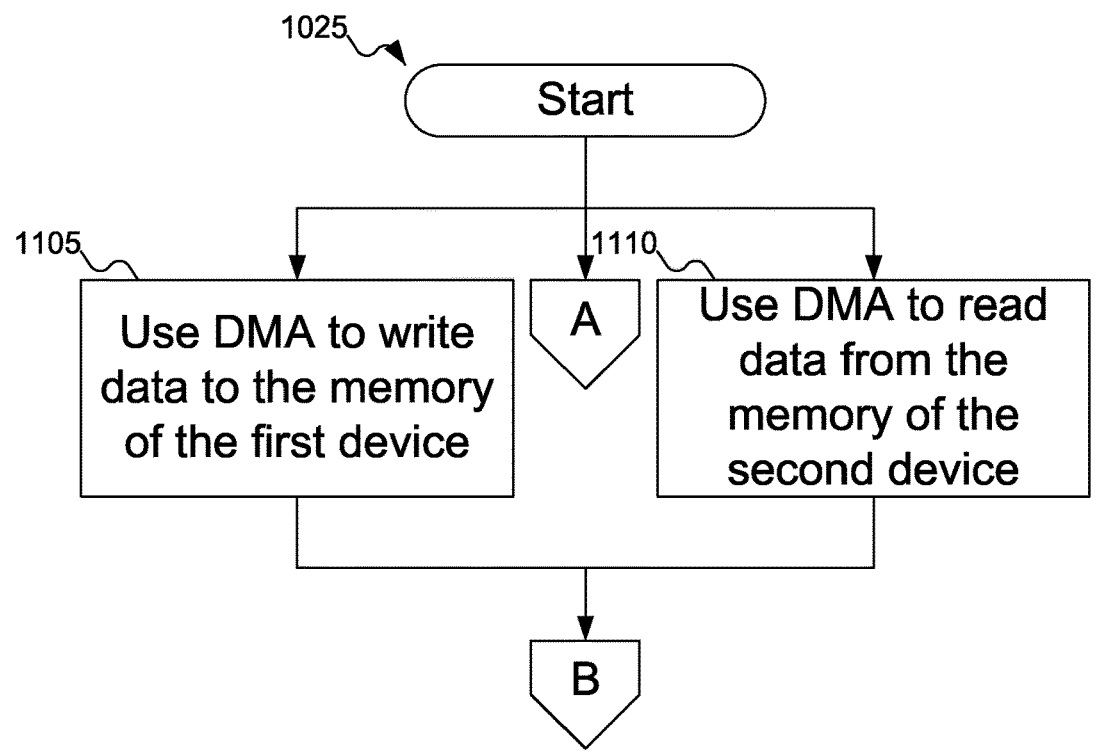
FIG. 11A shows a flowchart of an example procedure for devices attached to the multi-function device of FIG. 1 to share data, according to embodiments of the disclosure.
Figure 11B:
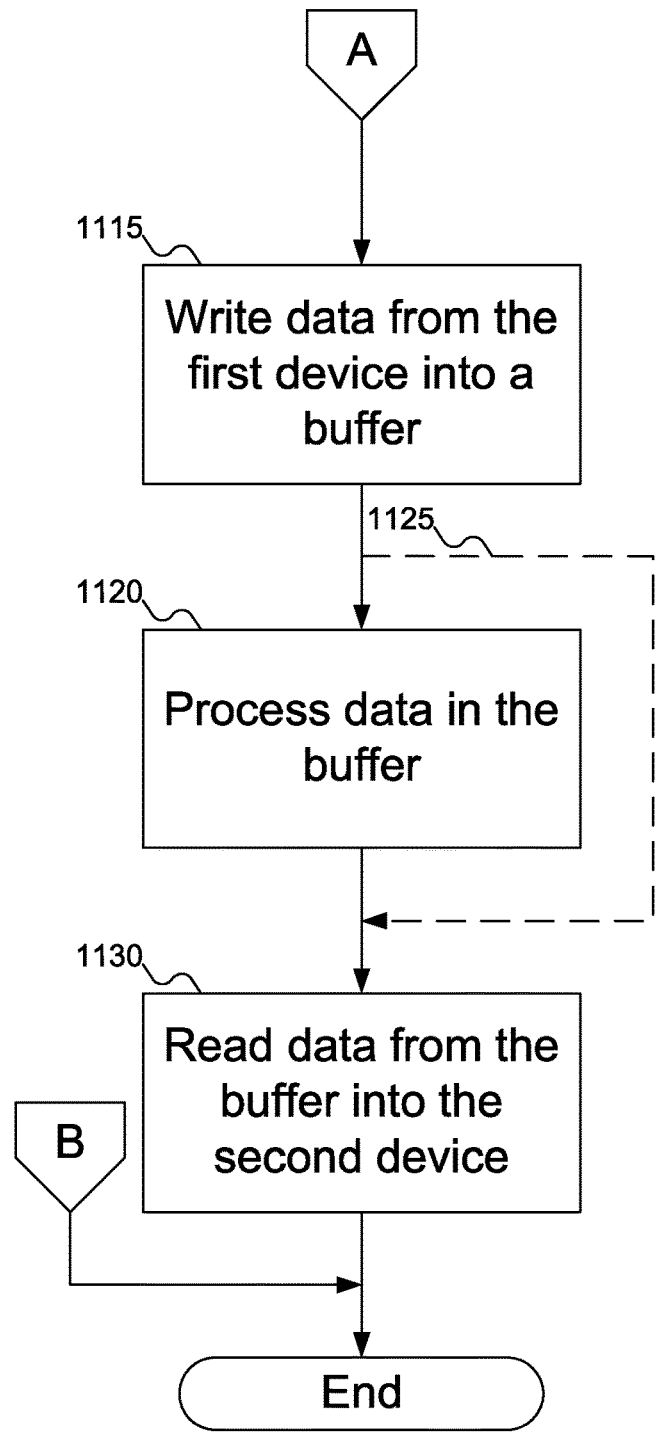
FIG. 11B continues the flowchart of FIG. 11A of the example procedure for devices attached to the multi-function device of FIG. 1 to share data, according to embodiments of the disclosure.

FIGS. 11A-11B show a flowchart of an example procedure for devices attached to multi-function device 135 of FIG. 1 to share data, according to embodiments of the disclosure. In FIG. 11A, at block 1105, one device may use DMA 440 of FIG. 4 or DMA 550 of FIGS. 5A-5D to write data to memory 435 of FIG. 4 or memory 545 of FIGS. 5A-5D. Alternatively, at block 1110, one device may use DMA 440 of FIG. 4 or DMA 550 of FIGS. 5A-5D to read data from memory 435 of FIG. 4 or memory 545 of FIGS. 5A-5D.

Alternatively, at block 1115 (FIG. 11B), one device may write data into buffer 370 of FIG. 3. At block 1120, data processor 375 of FIG. 3 may process the data in buffer 370 of FIG. 3, perhaps to put the data in a format that may be processed by the other device. Note that block 1120 is optional, as shown by dashed line 1125. Finally, at block 1130, the second device may read the data from buffer 370 of FIG. 3.

In FIGS. 6-11B, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a multi-function device. One or more storage devices, and one or more computational storage units, may be connected to the multi-function device. The multi-function device presents the connected storage devices and computational storage units to the host processor as though they were one device and exposing all functions offered by the attached devices, providing a technical advantage over attaching multiple individual devices to the host processor.

The multi-function device may also include a buffer, permitting data to be exchanged between the attached devices without passing through the host processor. The multi-function device may also include a data processor that may be used to transform the data as passed between the devices. The use of the buffer provides a technical advantage by removing the host processor and host memory from the process of passing data between the devices, thereby potentially expediting data transfer.

In storage, data processing is an emerging technology. Solid State Drives (SSDs) have become important components in persistent data storage for modern IT infrastructure. Data is being generated by various applications such as Internet of Things (IOT), social networks, autonomous vehicles, and so on. Processing large amounts of data in an efficient manner is important. Such data processing may involve resources such as CPU cycles, memory bandwidth, network bandwidth, and power, among others.

Embodiments of the disclosure may include a mutifunction device 135 of FIG. 1, including a Computational Storage SSD architecture for providing a multitude of compute resources. Embodiments of the disclosure may provide for moving large quantities of data to Central Processing Units (CPUs) for processing and may minimize needs expensive system resources such as power, CPU cycles, network bandwidth, and host memory.

Computational Storage is emerging technology that enables efficient data processing inside or near to the SSD. Embodiments of the disclosure enable a more efficient solution of the compute requirements without requiring different product stock keeping units (SKU's). The multi-function device 135 of FIG. 1 may implement an architecture that enables many different computer resources that can be matched to the needs of an application. Embodiments of the disclosure may include a flexible SSD architecture for computational storage. Embodiments of the disclosure may enable a pluggable module for a compute resource to be inserted into the base SSD controller board. Embodiments of the disclosure may enable usage of many different compute resources such as Field Programmable Gate Arrays (FPGAs), Graphic Processing Units (GPUs), Tensor Processing Units (TPUs), Neural Processing Units (NPUs), Network Interface Cards (NICs), Central Processing Units (CPUs), Systems on Chip (SoCs), and Application-Specific Integrated Circuits (ASICs) to be presented to the host as a multi-function device 135 of FIG. 1 in addition to the SSD controller. One Peripheral Component Interconnect Express (PCIe) physical function (PF) may be used to expose the NVMe controller for storage input/output (I/O) operation. Another PCIe PF may be used to expose desired compute resources to the host. The peer-to-peer data transfers between the SSD controller and the compute resource may be done inside the multi-function device 135 of FIG. 1. Such an architecture may enables optimized computational storage solution to different use cases.

Some embodiments of the disclosure may include a multi-function flexible SSD for computational storage applications. Some embodiments of the disclosure may include 1 or more PFs for storage I/O operations (NVMe). Some embodiments of the disclosure may include 1 or more PFs compute resources. Some embodiments of the disclosure may attach compute resources using a connector, so the compute resources may be replaced if required. Some embodiments of the disclosure may include peer-to-peer data transfers between the SSD controller and compute resource transparent to host. Some embodiments of the disclosure may include a PCIe Base Address Register (BAR) window or address range programmed by host software in a PCIe Bridge to the compute resource, which may be used as a Peer-to-Peer (P2P) address range. Some embodiments of the disclosure may enable the host and the SSD Controller to access the compute resource concurrently. Some embodiments of the disclosure may include host and SSD Controller Read Request Tag conflict management for P2P Direct Memory Access (DMA). Some embodiments of the disclosure may include concurrent storage I/Os and compute transactions. Some embodiments of the disclosure may allow a customer to use their own proprietary interface to the compute resource. Some embodiments of the disclosure may include Parallel PCIe-to-PCIe bridge(s), which may be used to connect to the SSD controller and the compute resource. Some embodiments of the disclosure may include Compute Resource PF BAR range used for P2P data transfers. Some embodiments of the disclosure may include many different kinds of compute resources: FPGA, ASIC, SoC, CPU, GPU, SoC, TPU, NPU, NIC, etc.

Embodiments of the disclosure may provide a number of advantages, such as the flexibility of computational storage SSD; an optimized solution for specific use cases; allowing customers to use their own, proprietary interface to the compute; and/or may allow easy and fast integration with existing customer system software stack.

An exemplary embodiment includes a system and method of flexible computational storage device. The emerging technology of computational storage aspires to eliminate or reduce large data transfers to the host memory for processing. The basic idea of computational storage is to process the data in or near the SSD itself and only transfer the results to the host. The use of compute resources may be expected to reduce power consumption, latency, CPU utilization, host bus bandwidth, host memory bandwidth, and other system resources.

In some embodiments of the disclosure, to achieve data processing inside or near the storage device, one or more compute resources may be integrated in or located near the storage device. Some examples of compute resource may include FPGA, ASIC, SoC, GPU, TPU, NPU, NIC, etc. Different applications may use different computational resources. In some embodiments of the disclosure, it may be cost effective to implement two or more such compute resources in a single computational storage device. In some embodiments of the disclosure, it may be more efficient to minimize the variety of computational storage devices or SKU's. Hence embodiments of the disclosure may enable a variety of compute elements to be integrated in or located near to an SSD using a connector. Such a multi-function device 135 of FIG. 1 may permit a variety of compute resources to be inserted on an as-needed basis.

The multi-function device 135 of FIG. 1 may include: a PCIe End Point that may advertise two or more Physical Functions (PF); a PCIe Root Port that may configure the end points attached to it, i.e., NVMe controller end-point and Compute Resource end-point; an Asynchronous First-In-First-Out memory that may enable clock boundary crossing between the PCIe clock and the local FPGA clock; a Multiplexer/Demultiplexer (PF) that may operate using a PF identifier value to forward or merge PCIe packets from PCIe bridge-storage and PCIe bridge-compute; a PCIe-PCIe bridge-compute module that may be used to perform pass-through of PCIe transactions between the host and the compute resource: the PCIe-PCIe bridge-compute module also may implement certain functions related to P2P data transfer between the storage device and the compute resource; a PCIe-PCIe bridge-storage module that may be used to perform pass-through of PCIe transactions between the host and the NVMe SSD Controller; the PCIe-PCIe bridge-storage module may also implement certain functions related to P2P data transfer between the storage device and the compute resource; and a Multiplexer/Demultiplexer (TLP) that may multiplex and de-multiplex host-compute resource and SSD controller-compute resource traffic transition layer packets (TLPs).

Embodiments of the disclosure may allow the compute resources to be advertised to the host using a PCIe multi-function device 135 of FIG. 1. One PCIe Physical Function (PF0) may be used to advertise a storage function based on the NVMe protocol. A separate physical function (PF1) may be used to advertise a compute function of a compute resource. In other embodiments of the disclosure, there may be two or more PFs used for storage (NVMe controllers), as well as two or more PFs used to integrate multiple compute elements.

In some embodiments of the disclosure, the NVMe controller as well as the compute resource may be connected to the host using PCIe-to-PCIe bridges as shown in FIG. 3. An FPGA may be used to implement two or more PCIe-to-PCIe bridges. Each PCIe bridge may pass host PCIe TLPs received on the End Point (EP) to the Root Ports (RPs) for the NVMe controller and compute resource.

The PCIe bridges may perform some or all of these functions: In some embodiments of the disclosure, the PCIe bridge may advertise multiple PCIe EP PFs to the host with configurations matching the NVMe controller and/or compute resource; In some embodiments of the disclosure, the PCIe bridge may perform the PCIe configuration of the NVMe controller and/or the compute resource end points; In some embodiments of the disclosure, the PCIe bridge may mirror the host PCIe configuration cycles to the NVMe controller and/or the compute resource PCIe end points; In some embodiments of the disclosure, the PCIe bridge may forward PCIe TLPs to/from the host and the NVMe controller or the compute resource; In some embodiments of the disclosure, the PCIe bridge may perform address translations for the pass-through TLPs.

In some embodiments of the multi-function device 135 of FIG. 1, peer-to-peer data movement between the storage device and the compute resource may be performed. In some embodiments of the disclosure, the PCIe bridge used for the compute resource may provide the address range used for data movement to the PCIe bridge used for the SSD controller. The P2P address range may be part of the PCIe BAR window or a range programmed by host software in the PCIe bridge. This address range and other related information may be termed as P2P control.

In some embodiments of the disclosure, the PCIe bridge-storage may take the P2P control information and may intercept all the TLPs coming from the NVMe SSD controller that fall in the P2P address range. The intercepted P2P PCIe transactions (Memory Write, and Memory Read) then may be presented to the Multiplexer/Demultiplexer module on the Root Port side. This Multiplexer/Demultiplexer module may merge TLPs coming from the host and coming from the PCIe bridge-storage and destined for the compute resource. This module may allow the host and the PCIe bridge-storage to concurrently access the compute resource. For Write transactions, which may be posted transactions, a simple TLP multiplexing may achieve the desired functionality. For Read Requests, which may be non-posted, completions packets coming back from the compute resource may be separated for the host and the PCIe bridge-storage. Such separation may be achieved using a Read Request tag value contained in each Read Request. However, conflicting tag values between the host and the PCIe bridge-storage may need to be managed, and multiple ways to handle Read Request tag conflict may be used.

In some embodiments of the disclosure, the completion packets in response to memory Read requests from the PCIe bridge-storage may be separated and sent to the PCIe bridge-storage, which in turn may forward them to the SSD controller. The Multiplexer/Demultiplexer module may keep track of Memory Read Request tags belonging to host Read requests and PCIe bridge-storage Read requests. Some embodiments of the disclosure may check that the Read Request tags do not conflict. Some embodiments of the disclosure may check that only one unique tag is active at any given time. In some embodiments of the disclosure, the multi-function device 135 of FIG. 1 may allow only one agent (host or PCIe bridge-storage) to issue a Read Request to the compute r. In other embodiments of the disclosure, the Multiplexer/Demultiplexer module may keep track of active read tags and may perform look-ups in a table for all the Read Requests from the host as well as from the PCIe bridge-storage. In some embodiments of the disclosure, if the same tag is found be already active, the Multiplexer/Demultiplexer module may delay that request until the active tag is freed up. In some embodiments of the disclosure, if no conflict is found, the Multiplexer/Demultiplexer module may allow multiple concurrent Read Requests to be sent to the compute resource. In some embodiments of the disclosure, it may be possible to allocate two sets of Read Request Tag values to the Host and the PCIe bridge-storage so that tag conflict may be avoided. In some embodiments of the disclosure, the Multiplexer/Demultiplexer module may perform one level of indirection or translation of the incoming Read Request tags such that no tag conflict happens. The original incoming tag and translated tag values may be kept in a table and translation may be performed in both directions: Read Requests to compute resource, and Completions coming back from compute resource.

Some embodiments of the disclosure enable the SSD controller to perform Direct Memory Access (DMA) operations to the compute resource memory without burdening the host CPU. Embodiments of the disclosure may include some or all of these features: a multi-function flexible SSD for computational storage applications; 1 or more PFs for storage I/O operations (NVMe); 1 or more PFs for compute resources; compute resources may be attached using a connector, so that compute resources may be replaced if required; peer-to-peer data transfers between the SSD controller and the compute resource may be transparent to the host; a PCIe BAR window or address range programmed by host software in the PCIe bridge that be used as P2P address range; the host and the SSD controller may access the compute resource concurrently; Read Request Tag conflict management between the host and the SSD controller for P2P DMA; concurrent storage I/Os and compute transactions; a customer may use a proprietary interface to the compute resource; parallel PCIe to-PCIe bridge(s) used to connect to the SSD controller and the compute resource; compute resource PF BAR range used for P2P data transfers; many different kinds of compute resources: FPGA, ASIC, SoC, CPU, GPU, TPU, NPU, NIC, etc.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a multi-function device, comprising:
a first port to communicate with a host processor;
a second port to communicate with a storage device;
a third port to communicate with a computational storage unit; and
a circuit to route a message from the host processor to at least one of the storage device or the computational storage unit.

Statement 2. An embodiment of the disclosure includes the multi-function device according to statement 1, wherein the multi-function device is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), a network interface card (NIC), or a system-on-a-chip (SoC).

Statement 3. An embodiment of the disclosure includes the multi-function device according to statement 1, further comprising a fourth port to communicate with a second storage device.

Statement 4. An embodiment of the disclosure includes the multi-function device according to statement 1, further comprising a fourth port to communicate with a second computational storage unit.

Statement 5. An embodiment of the disclosure includes the multi-function device according to statement 1, wherein the circuit includes a multiplexer/demultiplexer configured to identify the at least one of the storage device or the computational storage unit as a destination for the message based at least in part on a data in the message.

Statement 6. An embodiment of the disclosure includes the multi-function device according to statement 5, wherein the circuit further includes:
a first bridge connected to the second port; and
a second bridge connected to the third port,
wherein the multiplexer/demultiplexer is configured to route the message to at least one of the first bridge or the second bridge based at least in part on the data in the message.

Statement 7. An embodiment of the disclosure includes the multi-function device according to statement 1, wherein:
the first port includes an endpoint;
the second port includes a first root port; and
the third port includes a second root port.

Statement 8. An embodiment of the disclosure includes the multi-function device according to statement 7, wherein:
the first root port is configured to identify at least a first exposed function of the storage device;
the second root port is configured to identify at least a second exposed function of the computational storage unit; and
the endpoint is configured to expose at least the first exposed function and the second exposed function.

Statement 9. An embodiment of the disclosure includes the multi-function device according to statement 8, wherein the first exposed function includes at least one of a Physical Function (PF) or a Virtual Function (VF).

Statement 10. An embodiment of the disclosure includes the multi-function device according to statement 8, wherein the second exposed function includes at least one of a PF or a VF.

Statement 11. An embodiment of the disclosure includes the multi-function device according to statement 1, further comprising an asynchronous buffer.

Statement 12. An embodiment of the disclosure includes the multi-function device according to statement 11, wherein the asynchronous buffer is configured to operate using a clock cycle different from at least one of the host processor, the storage device, or the computational storage unit.

Statement 13. An embodiment of the disclosure includes the multi-function device according to statement 11, wherein the asynchronous buffer is connected to one of the first port, the second port, or the third port.

Statement 14. An embodiment of the disclosure includes the multi-function device according to statement 11, wherein:
the asynchronous buffer is connected to the first port; and
the multi-function device further comprises:
 a second asynchronous buffer connected to the second port; and
 a third asynchronous buffer connected to the third port.

Statement 15. An embodiment of the disclosure includes the multi-function device according to statement 14, wherein:
the asynchronous buffer is configured to operate using a clock cycle different from the host processor;
the second asynchronous buffer is configured to operate using a clock cycle different from the storage device; and
the third asynchronous buffer is configured to operate using a clock cycle different from the computational storage unit.

Statement 16. An embodiment of the disclosure includes the multi-function device according to statement 1, wherein the storage device includes a Non-Volatile Memory Express (NVMe) storage device.

Statement 17. An embodiment of the disclosure includes the multi-function device according to statement 16, wherein the NVMe storage device includes an NVMe Solid State Drive (SSD).

Statement 18. An embodiment of the disclosure includes the multi-function device according to statement 1, wherein the first port is configured to connect to a Peripheral Component Interconnect Express (PCIe) bus.

Statement 19. An embodiment of the disclosure includes the multi-function device according to statement 1, wherein the multi-function device is configured to communicate with at least one of the host processor, the storage device or the computational storage unit using a protocol, the protocol at least one of PCIe, Ethernet, Remote Direct Memory Access (RDMA), Transmission Control Protocol/Internet Protocol (TCP/IP), InfiniB and, Serial Attached Small Computer System Interface (SCSI) (SAS), Internet SCSI (iSCSI), and Serial AT Attachment (SATA).

Statement 20. An embodiment of the disclosure includes the multi-function device according to statement 1, wherein the second port is connected to a connector, the connector configured to permit replacing the computational storage unit with a second computational storage unit.

Statement 21. An embodiment of the disclosure includes the multi-function device according to statement 1, wherein multi-function device enables the host processor and the storage device to communicate with the computational storage unit concurrently.

Statement 22. An embodiment of the disclosure includes the multi-function device according to statement 1, further comprising a second circuit for peer-to-peer communication.

Statement 23. An embodiment of the disclosure includes the multi-function device according to statement 22, wherein the second circuit includes a third circuit for communication between the storage device and a second storage device.

Statement 24. An embodiment of the disclosure includes the multi-function device according to statement 22, wherein the second circuit includes a third circuit for communication between the computational storage unit and a second computational storage unit.

Statement 25. An embodiment of the disclosure includes the multi-function device according to statement 22, wherein the second circuit includes a third circuit for communication between the storage device and the computational storage unit.

Statement 26. An embodiment of the disclosure includes the multi-function device according to statement 25, wherein:
the storage device includes a memory; and
the second circuit includes a direct memory addressing circuit in the computational storage unit to access the memory.

Statement 27. An embodiment of the disclosure includes the multi-function device according to statement 25, wherein
the computational storage unit includes a memory; and
the second circuit includes a direct memory addressing circuit in the storage device to access the memory.

Statement 28. An embodiment of the disclosure includes the multi-function device according to statement 25, wherein the second circuit includes a buffer to store data to be shared with the computational storage unit.

Statement 29. An embodiment of the disclosure includes the multi-function device according to statement 28, wherein:
the multi-function device further comprises a fourth port to communicate with a second computational storage unit; and
the second circuit further includes a second buffer for data to be shared with the second computational storage unit.

Statement 30. An embodiment of the disclosure includes the multi-function device according to statement 28, wherein the storage device is configured to read data from or write data to the buffer.

Statement 31. An embodiment of the disclosure includes the multi-function device according to statement 28, wherein the computational storage unit is configured to read data from or write data to the buffer.

Statement 32. An embodiment of the disclosure includes the multi-function device according to statement 28, wherein the second circuit further includes a data processor to process a data in the buffer.

Statement 33. An embodiment of the disclosure includes the multi-function device according to statement 32, wherein the data processor is configured to schedule access to the buffer by the storage device or the computational storage unit.

Statement 34. An embodiment of the disclosure includes the multi-function device according to statement 32, wherein the data processor is configured to process the data in the buffer to generate a second data.

Statement 35. An embodiment of the disclosure includes the multi-function device according to statement 34, wherein the data processor is further configured to store the second data in the buffer.

Statement 36. An embodiment of the disclosure includes the multi-function device according to statement 35, wherein the data processor is further configured to delete the data from the buffer.

Statement 37. An embodiment of the disclosure includes the multi-function device according to statement 34, wherein the data processor is configured to transcode the data in the buffer to generate the second data.

Statement 38. An embodiment of the disclosure includes the multi-function device according to statement 25, further comprising a multiplexer/demultiplexer configured to enable the computational storage unit to communicate with the host processor and the storage device.

Statement 39. An embodiment of the disclosure includes the multi-function device according to statement 38, wherein:
the circuit to route the message includes:
  a first bridge connected to the second port; and
  a second bridge connected to the third port; and
the multiplexer/demultiplexer is connected to the first bridge and the second bridge.

Statement 40. An embodiment of the disclosure includes the multi-function device according to statement 25, wherein the host processor includes a first address range for communicating with the storage device, a second address range for communicating with the computational storage unit, and a third address range for peer-to-peer communication between the storage device and the computational storage unit.

Statement 41. An embodiment of the disclosure includes a method, comprising:
receiving a request at a first port of a multi-function device from a host processor;
identifying a first device from the request;
identifying a second port of the multi-function device connected to the first device; and
transmitting the request to the first device over the second port of the multi-function device,
wherein the multi-function device includes a third port connected to a second device;
the first device is drawn from a set including a storage device or a computational storage unit; and
the second device is drawn from the set including the storage device or the computational storage unit.

Statement 42. An embodiment of the disclosure includes the method according to statement 41, wherein the storage device includes a Non-Volatile Memory Express (NVMe) storage device.

Statement 43. An embodiment of the disclosure includes the method according to statement 42, wherein the NVMe storage device includes an NVMe Solid State Drive (SSD).

Statement 44. An embodiment of the disclosure includes the method according to statement 41, wherein the multi-function device is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), a network interface card (NIC), or a system-on-a-chip (SoC).

Statement 45. An embodiment of the disclosure includes the method according to statement 41, wherein receiving the request at the first port of the multi-function device from the host processor includes receiving the request at the first port of the multi-function device from the host processor over a Peripheral Component Interconnect Express (PCIe) bus.

Statement 46. An embodiment of the disclosure includes the method according to statement 41, wherein the multi-function device is configured to communicate with at least one of the host processor or the first device using a protocol, the protocol including at least one of PCIe, Ethernet, Remote Direct Memory Access (RDMA), Transmission Control Protocol/Internet Protocol (TCP/IP), InfiniB and, Serial Attached Small Computer System Interface (SCSI) (SAS), Internet SCSI (iSCSI), or Serial AT Attachment (SATA).

Statement 47. An embodiment of the disclosure includes the method according to statement 41, wherein receiving the request at the first port of the multi-function device from the host processor includes receiving the request using a protocol at the first port of the multi-function device from the host processor, the protocol including at least one of PCIe, Ethernet, RDMA, TCP/IP, InfiniBand, (SAS), iSCSI, or SATA.

Statement 48. An embodiment of the disclosure includes the method according to statement 41, wherein transmitting the request to the first device over the second port of the multi-function device includes transmitting the request using a protocol to the first device over the second port of the multi-function device, the protocol including at least one of PCIe, Ethernet, RDMA, TCP/IP, InfiniBand, (SAS), iSCSI, or SATA.

Statement 49. An embodiment of the disclosure includes the method according to statement 41, further comprising:
receiving a second request at the first port of the multi-function device from the host processor;
identifying a third device from the second request;
identifying a fourth port of the multi-function device connected to the third device; and
transmitting the second request to the third device over the fourth port of the multi-function device.

Statement 50. An embodiment of the disclosure includes the method according to statement 49, wherein the third device is drawn from a set including a second storage device or a second computational storage unit.

Statement 51. An embodiment of the disclosure includes the method according to statement 41, wherein:
receiving the request at the first port of the multi-function device from the host processor includes receiving the request at an endpoint of the multi-function device from the host processor;
transmitting the request to the first device over the second port of the multi-function device includes transmitting the request to the first device over a root port of the multi-function device.

Statement 52. An embodiment of the disclosure includes the method according to statement 51, wherein:
the third port includes a second root port of the multi-function device; and
the method further comprises:
  identifying at least a first exposed function of the first device over the root port;
  identifying at least a second exposed function of the second device over the second root port; and exposing at least the first exposed function and the second exposed function to the host processor at the endpoint of the multi-function device.

Statement 53. An embodiment of the disclosure includes the method according to statement 52, wherein the first exposed function includes at least one of a Physical Function (PF) or a Virtual Function (VF).

Statement 54. An embodiment of the disclosure includes the method according to statement 52, wherein the second exposed function includes at least one of a PF or a VF.

Statement 55. An embodiment of the disclosure includes the method according to statement 41, wherein receiving the request at the first port of the multi-function device from the host processor includes storing the request in an asynchronous buffer of the multi-function device connected to the first port.

Statement 56. An embodiment of the disclosure includes the method according to statement 55, wherein the asynchronous buffer of the multi-function device is configured to operate using a clock cycle different from the host processor.

Statement 57. An embodiment of the disclosure includes the method according to statement 55, wherein transmitting the request to the first device over the second port of the multi-function device includes storing the request in a second asynchronous buffer of the multi-function device connected to the second port.

Statement 58. An embodiment of the disclosure includes the method according to statement 57, wherein the second asynchronous buffer of the multi-function device is configured to operate using a clock cycle different from the first device.

Statement 59. An embodiment of the disclosure includes the method according to statement 58, wherein the multi-function device includes a third asynchronous buffer connected to the third port, the third asynchronous buffer configured to operate using a clock cycle different from the second device.

Statement 60. An embodiment of the disclosure includes the method according to statement 41, wherein:
the first device includes a first computational storage unit; and
the method further comprises replacing the first computational storage unit with a second computational storage unit.

Statement 61. An embodiment of the disclosure includes the method according to statement 41, further comprising:
receiving a second request at the third port of the multi-function device from the second device;
identifying the first device from the second request;
identifying the second port of the multi-function device connected to the first device; and
transmitting the second request to the first device over the second port of the multi-function device.

Statement 62. An embodiment of the disclosure includes the method according to statement 61, wherein transmitting the second request to the first device over the second port of the multi-function device includes transmitting the second request to the first device over the second port of the multi-function device concurrently with transmitting the request to the first device over the second port of the multi-function device.

Statement 63. An embodiment of the disclosure includes the method according to statement 41, further comprising providing a data from the second device to the first device.

Statement 64. An embodiment of the disclosure includes the method according to statement 63, wherein:
the first device includes a first storage device;
the second device includes a second storage device.

Statement 65. An embodiment of the disclosure includes the method according to statement 63, wherein:
the first device includes a first computational storage unit;
the second device includes a second computational storage unit.

Statement 66. An embodiment of the disclosure includes the method according to statement 63, wherein:
the first device includes the storage device;
the second device includes the computational storage unit.

Statement 67. An embodiment of the disclosure includes the method according to statement 66, wherein:
the storage device includes a memory; and
providing the data from the second device to the first device includes reading the data from the memory of the storage device by the computational storage unit using a direct memory addressing circuit.

Statement 68. An embodiment of the disclosure includes the method according to statement 66, wherein:
the computational storage unit includes a memory; and
providing the data from the second device to the first device includes writing the data into the memory of the computational storage unit by the storage device using a direct memory addressing circuit.

Statement 69. An embodiment of the disclosure includes the method according to statement 66, wherein providing the data from the second device to the first device includes:
writing the data into a buffer by the first device; and
reading the data from the buffer by the second device.

Statement 70. An embodiment of the disclosure includes the method according to statement 69, further comprising:
writing a second data into a second buffer by a first device; and
reading the second data from the second buffer by a third device connected to a fourth port of the multi-function device.

Statement 71. An embodiment of the disclosure includes the method according to statement 69, wherein:
the method further comprises processing the data in the buffer using a data processor to generate a second data; and
reading the data from the buffer by the second device includes reading the second data from the buffer by the second device.

Statement 72. An embodiment of the disclosure includes the method according to statement 71, wherein processing the data in the buffer using the data processor to generate the second data includes processing the data in the buffer using the data processor to generate the second data based at least in part on a command from the host processor.

Statement 73. An embodiment of the disclosure includes the method according to statement 72, wherein processing the data in the buffer using the data processor to generate the second data further includes notifying the host processor based at least in part on the second data being generated.

Statement 74. An embodiment of the disclosure includes the method according to statement 69, wherein:

writing the data into a buffer by the first device includes writing the data into a buffer by the first device based at least in part on a first command from the host processor; and reading the data from the buffer by the second device includes reading the data from the buffer by the second device based at least in part on a second command from the host processor.

Statement 75. An embodiment of the disclosure includes the method according to statement 74, wherein:

writing the data into a buffer by the first device further includes notifying the host processor based at least in part on the second data being written into the buffer; and reading the data from the buffer by the second device further includes notifying the host processor based at least in part on the second data being read from the buffer.

Statement 76. An embodiment of the disclosure includes the method according to statement 66, wherein providing the data from the second device to the first device includes receiving a command from the host processor in an address range associated with peer-to-peer communication.

Statement 77. An embodiment of the disclosure includes an article, comprising a non-transitory storage medium, the non-transitory storage medium having stored thereon instructions that, when executed by a machine, result in:

receiving a request at a first port of a multi-function device from a host processor;

identifying a first device from the request;

identifying a second port of the multi-function device connected to the first device; and transmitting the request to the first device over the second port of the multi-function device, wherein the multi-function device includes a third port connected to a second device the first device is drawn from a set including a storage device or a computational storage unit; and the second device is drawn from the set including the storage device or the computational storage unit.

Statement 78. An embodiment of the disclosure includes the article according to statement 77, wherein the storage device includes a Non-Volatile Memory Express (NVMe) storage device.

Statement 79. An embodiment of the disclosure includes the article according to statement 78, wherein the NVMe storage device includes an NVMe Solid State Drive (SSD).

Statement 80. An embodiment of the disclosure includes the article according to statement 77, wherein the multi-function device is implemented using at least one of a Field Programmable Gate Array (FPGA), an Application-Specific Integrated Circuit (ASIC), a central processing unit (CPU), a graphics processing unit (GPU), a general purpose GPU (GPGPU), a tensor processing unit (TPU), a neural processing unit (NPU), or a network interface card (NIC), a system-on-a-chip (SoC).

Statement 81. An embodiment of the disclosure includes the article according to statement 77, wherein receiving the request at the first port of the multi-function device from the host processor includes receiving the request at the first port of the multi-function device from the host processor over a Peripheral Component Interconnect Express (PCIe) bus.

Statement 82. An embodiment of the disclosure includes the article according to statement 77, wherein the multi-function device is configured to communicate with at least one of the host processor or the first device using a protocol, the protocol including at least one of PCIe, Ethernet, Remote Direct Memory Access (RDMA), Transmission Control Protocol/Internet Protocol (TCP/IP), InfiniB and, Serial Attached Small Computer System Interface (SCSI) (SAS), Internet SCSI (iSCSI), or Serial AT Attachment (SATA).

Statement 83. An embodiment of the disclosure includes the article according to statement 77, wherein receiving the request at the first port of the multi-function device from the host processor includes receiving the request using a protocol at the first port of the multi-function device from the host processor, the protocol including at least one of PCIe, Ethernet, RDMA, TCP/IP, InfiniBand, (SAS), iSCSI, or SATA.

Statement 84. An embodiment of the disclosure includes the article according to statement 77, wherein transmitting the request to the first device over the second port of the multi-function device includes transmitting the request using a protocol to the first device over the second port of the multi-function device, the protocol including at least one of PCIe, Ethernet, RDMA, TCP/IP, InfiniBand, (SAS), iSCSI, or SATA.

Statement 85. An embodiment of the disclosure includes the article according to statement 77, the non-transitory storage medium having stored thereon further instructions that, when executed by the machine, result in:

receiving a second request at the first port of the multi-function device from the host processor;

identifying a third device from the second request;

identifying a fourth port of the multi-function device connected to the third device; and transmitting the second request to the third device over the fourth port of the multi-function device.

Statement 86. An embodiment of the disclosure includes the article according to statement 85, wherein the third device is drawn from a set including a second storage device or a second computational storage unit.

Statement 87. An embodiment of the disclosure includes the article according to statement 77, wherein:

receiving the request at the first port of the multi-function device from the host processor includes receiving the request at an endpoint of the multi-function device from the host processor;

transmitting the request to the first device over the second port of the multi-function device includes transmitting the request to the first device over a root port of the multi-function device.

Statement 88. An embodiment of the disclosure includes the article according to statement 87, wherein:

the third port includes a second root port of the multi-function device; and the non-transitory storage medium has stored thereon further instructions that, when executed by the machine, result in:

identifying at least a first exposed function of the first device over the root port;

identifying at least a second exposed function of the second device over the second root port; and exposing at least the first exposed function and the second exposed function to the host processor at the endpoint of the multi-function device.

Statement 89. An embodiment of the disclosure includes the article according to statement 88, wherein the first exposed function includes at least one of a Physical Function (PF) or a Virtual Function (VF).

Statement 90. An embodiment of the disclosure includes the article according to statement 88, wherein the second exposed function includes at least one of a PF or a VF.

Statement 91. An embodiment of the disclosure includes the article according to statement 77, wherein receiving the request at the first port of the multi-function device from the host processor includes storing the request in an asynchronous buffer of the multi-function device connected to the first port.

Statement 92. An embodiment of the disclosure includes the article according to statement 91, wherein the asynchronous buffer of the multi-function device is configured to operate using a clock cycle different from the host processor.

Statement 93. An embodiment of the disclosure includes the article according to statement 91, wherein transmitting the request to the first device over the second port of the multi-function device includes storing the request in a second asynchronous buffer of the multi-function device connected to the second port.

Statement 94. An embodiment of the disclosure includes the article according to statement 93, wherein the second asynchronous buffer of the multi-function device is configured to operate using a clock cycle different from the first device.

Statement 95. An embodiment of the disclosure includes the article according to statement 94, wherein the multi-function device includes a third asynchronous buffer connected to the third port, the third asynchronous buffer configured to operate using a clock cycle different from the second device.

Statement 96. An embodiment of the disclosure includes the article according to statement 77, wherein:
the first device includes a first computational storage unit; and
the non-transitory storage medium has stored thereon further instructions that, when executed by the machine, result in replacing the first computational storage unit with a second computational storage unit.

Statement 97. An embodiment of the disclosure includes the article according to statement 77, the non-transitory storage medium having stored thereon further instructions that, when executed by the machine, result in:
receiving a second request at the third port of the multi-function device from the second device;
identifying the first device from the second request;
identifying the second port of the multi-function device connected to the first device; and
transmitting the second request to the first device over the second port of the multi-function device.

Statement 98. An embodiment of the disclosure includes the article according to statement 97, wherein transmitting the second request to the first device over the second port of the multi-function device includes transmitting the second request to the first device over the second port of the multi-function device concurrently with transmitting the request to the first device over the second port of the multi-function device.

Statement 99. An embodiment of the disclosure includes the article according to statement 77, the non-transitory storage medium having stored thereon further instructions that, when executed by the machine, result in providing a data from the second device to the first device.

Statement 100. An embodiment of the disclosure includes the article according to statement 99, wherein:
the first device includes a first storage device;
the second device includes a second storage device.

Statement 101. An embodiment of the disclosure includes the article according to statement 99, wherein:
the first device includes a first computational storage unit;
the second device includes a second computational storage unit.

Statement 102. An embodiment of the disclosure includes the article according to statement 99, wherein:
the first device includes the storage device;
the second device includes the computational storage unit.

Statement 103. An embodiment of the disclosure includes the article according to statement 102, wherein:
the storage device includes a memory; and
providing the data from the second device to the first device includes reading the data from the memory of the storage device by the computational storage unit using a direct memory addressing circuit.

Statement 104. An embodiment of the disclosure includes the article according to statement 102, wherein:
the computational storage unit includes a memory; and
providing the data from the second device to the first device includes writing the data into the memory of the computational storage unit by the storage device using a direct memory addressing circuit.

Statement 105. An embodiment of the disclosure includes the article according to statement 102, wherein providing the data from the second device to the first device includes:
writing the data into a buffer by the first device; and
reading the data from the buffer by the second device.

Statement 106. An embodiment of the disclosure includes the article according to statement 105, the non-transitory storage medium having stored thereon further instructions that, when executed by the machine, result in:
writing a second data into a second buffer by a first device; and
reading the second data from the second buffer by a third device connected to a fourth port of the multi-function device.

Statement 107. An embodiment of the disclosure includes the article according to statement 105, wherein:
the non-transitory storage medium has stored thereon further instructions that, when executed by the machine, result in processing the data in the buffer using a data processor to generate a second data; and
reading the data from the buffer by the second device includes reading the second data from the buffer by the second device.

Statement 108. An embodiment of the disclosure includes the article according to statement 107, wherein processing the data in the buffer using the data processor to generate the second data includes processing the data in the buffer using the data processor to generate the second data based at least in part on a command from the host processor.

Statement 109. An embodiment of the disclosure includes the article according to statement 108, wherein processing the data in the buffer using the data processor to generate the second data further includes notifying the host processor based at least in part on the second data being generated.

Statement 110. An embodiment of the disclosure includes the article according to statement 105, wherein:

writing the data into a buffer by the first device includes writing the data into a buffer by the first device based at least in part on a first command from the host processor; and reading the data from the buffer by the second device includes reading the data from the buffer by the second device based at least in part on a second command from the host processor.

Statement 111. An embodiment of the disclosure includes the article according to statement 110, wherein:

writing the data into a buffer by the first device further includes notifying the host processor based at least in part on the second data being written into the buffer; and reading the data from the buffer by the second device further includes notifying the host processor based at least in part on the second data being read from the buffer.

Statement 112. An embodiment of the disclosure includes the article according to statement 102, wherein providing the data from the second device to the first device includes receiving a command from the host processor in an address range associated with peer-to-peer communication.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A multi-function device, comprising:
 a first port to communicate with a host processor;
 a second port to communicate with a storage device;
 a third port to communicate with a computational storage unit;
 a first circuit connected to the first port, the second port, and the third port to route a message from the host processor to at least one of the storage device or the computational storage unit;
 a second circuit connected to the second port and the third port to support peer-to-peer communication between the storage device and the computational storage unit;
 a buffer to store a first data and a second data, a first device configured to write the first data into the buffer and a second device configured to read the second data from the buffer, the first device one of the storage device and the computational storage unit and the second device one of the storage device and the computational storage unit, the first device different from the second device; and
 a data processor to process the first data in the buffer to generate the second data, the first data different from the second data.

2. The multi-function device according to claim 1, wherein the first circuit includes a multiplexer/demultiplexer configured to identify the at least one of the storage device or the computational storage unit as a destination for the message based at least in part on a data in the message.

3. The multi-function device according to claim 2, wherein the first circuit further includes:
 a first bridge connected to the second port; and
 a second bridge connected to the third port,
 wherein the multiplexer/demultiplexer is configured to route the message to at least one of the first bridge or the second bridge based at least in part on the data in the message.

4. The multi-function device according to claim 1, wherein:
 the first port includes an endpoint;
 the second port includes a first root port; and
 the third port includes a second root port.

5. The multi-function device according to claim 4, wherein:
 the first root port is configured to identify at least a first exposed function of the storage device;
 the second root port is configured to identify at least a second exposed function of the computational storage unit; and
 the endpoint is configured to expose at least the first exposed function and the second exposed function.

6. The multi-function device according to claim 1, wherein the computational storage unit includes a network interface card (NIC).

7. The multi-function device according to claim 1, wherein the multi-function device is configured to communicate with at least one of the host processor, the storage device or the computational storage unit using a protocol, the protocol including at least one of Peripheral Component Interconnect Express (PCIe), Ethernet, Remote Direct Memory Access (RDMA), Transmission Control Protocol/Internet Protocol (TCP/IP), InfiniB and, Serial Attached Small Computer System Interface (SCSI) (SAS), Internet SCSI (iSCSI), or Serial AT Attachment (SATA).

8. A method, comprising:
 receiving, performed by a multi-function device, a request at a first port from a host processor;
 identifying, performed by the multi-function device, a first device from the request;
 identifying, performed by the multi-function device, a second port of the multi-function device connected to the first device;
 transmitting, performed by the multi-function device, the request from the multi-function device to the first device over the second port of the multi-function device;
 writing, performed by the first device via the second port, a first data in a buffer, the multi-function device including the buffer;
 processing, performed by a data processor, the first data in the buffer to generate a second data in the buffer, the second data different from the first data, the multi-function device including the data processor; and
 reading, performed by a second device via a third port, the second data from the buffer,
 wherein the multi-function device includes the third port connected to the second device, and
 wherein the first device is drawn from a set including a storage device or a computational storage unit,
 the second device is drawn from the set including the storage device or the computational storage unit, and
 the first device is different from the second device.

9. The method according to claim 8, wherein:
receiving the request at the first port of the multi-function device from the host processor includes receiving the request at an endpoint of the multi-function device from the host processor;
transmitting the request to the first device over the second port of the multi-function device includes transmitting the request to the first device over a root port of the multi-function device.

10. The method according to claim 9, wherein:
the third port includes a second root port of the multi-function device; and
the method further comprises:
identifying at least a first exposed function of the first device over the root port;
identifying at least a second exposed function of the second device over the second root port; and
exposing at least the first exposed function and the second exposed function to the host processor at the endpoint of the multi-function device.

11. An article, comprising a non-transitory storage medium, the non-transitory storage medium having stored thereon instructions that, when executed by a machine, result in:
receiving a request at a first port of a multi-function device from a host processor;
identifying a first device from the request;
identifying a second port of the multi-function device connected to the first device;
transmitting the request to the first device over the second port of the multi-function device;
writing a first data in a buffer, the multi-function device including the buffer;
processing the first data in the buffer to generate a second data in the buffer, the second data different from the first data, the multi-function device including the data processor; and
reading the second data from the buffer,
wherein the multi-function device includes the third port connected to the second device, and
wherein the first device is drawn from a set including a storage device or a computational storage unit,
the second device is drawn from the set including the storage device or the computational storage unit, and
the first device is different from the second device.

12. The multi-function device according to claim 2, wherein the second circuit includes a second multiplexer/demultiplexer configured to identify the second device based on a second message from the first device.

13. The multi-function device according to claim 1, wherein:
the first data includes a third data in a first format;
the second data includes the third data in a second format; and
the data processor is configured to convert the third data from the first format to the second format.

14. The method according to claim 8, wherein identifying the first device from the request includes identifying the first device from the request using a multiplexer/demultiplexer.

15. The method according to claim 14, further comprising:
receiving a second request at the second port of the first device;
identifying the second device from the second request using a second multiplexer/demultiplexer; and
transmitting the second request from the multi-function device to the second device over the third port of the multi-function device.

16. The method according to claim 15, wherein the second request includes a peer-to-peer communication between the first device and the second device.

17. The method according to claim 8, wherein the multi-function device supports peer-to-peer communication between the first device and the second device.

* * * * *